(12) United States Patent
Higasayama et al.

(10) Patent No.: US 6,311,098 B1
(45) Date of Patent: Oct. 30, 2001

(54) METHOD AND APPARATUS FOR PREPARING DATA ON TOOL MOVING PATH, AND MACHINING METHOD AND SYSTEM

(75) Inventors: Haruhisa Higasayama, Kasugai; Hagemu Kato, Toyota; Yoshiki Muta, Toyota; Eisuke Kajisa, Toyota; Kouji Tamaoka, Chiba, all of (JP)

(73) Assignees: Toyota Jidosha Kabushiki Kaisha, Aichi; Nihon Unisys Ltd., Tokyo, both of (JP)

( * ) Notice: Subject to any disclaimer, the term of this patent is extended or adjusted under 35 U.S.C. 154(b) by 0 days.

(21) Appl. No.: 09/155,409
(22) PCT Filed: Mar. 25, 1997
(86) PCT No.: PCT/JP97/01000
 § 371 Date: Sep. 28, 1998
 § 102(e) Date: Sep. 28, 1998
(87) PCT Pub. No.: WO97/36216
 PCT Pub. Date: Oct. 2, 1997

(30) Foreign Application Priority Data

Mar. 26, 1997 (JP) .................................................. 8/070372

(51) Int. Cl.[7] .................................................. G05F 19/00
(52) U.S. Cl. ..................... 700/159; 700/180; 700/187; 711/159
(58) Field of Search ................................. 700/159, 188, 700/145, 160, 186, 184; 711/158

(56) References Cited

U.S. PATENT DOCUMENTS

| 4,825,377 | * | 4/1989 | Seki et al. | 364/474.29 |
| 4,866,631 | * | 9/1989 | Kuragano et al. | 364/474.29 |
| 4,868,761 | * | 9/1989 | Hayashi | 364/474.24 |
| 4,893,251 | * | 1/1990 | Seki et al. | 364/474.29 |
| 5,369,592 | * | 11/1994 | Honda | 364/474.29 |

FOREIGN PATENT DOCUMENTS

| 57 113113 A | 7/1982 | (JP) . |
| 61 272805 A | 12/1986 | (JP) . |

(List continued on next page.)

OTHER PUBLICATIONS

"High–Quality Intersection Calculation of Surfaces by Geometrical Tracing of Intersections", M. Higashi, et al., JSPE–56–01 90–91–92, pp. 92–97.

"Tool Path Generation of High–Quality Automatic Finish Machining", M. Higashi, et al., pp. 627–637.

*Primary Examiner*—David Wiley
*Assistant Examiner*—Firmin Backer
(74) *Attorney, Agent, or Firm*—Oblon, Spivak, McClelland, Maier & Neustadt, P.C.

(57) ABSTRACT

Method of generating tool movement path data 9 includes determining a tool constraining surface (12) which is offset from a three-dimensional surface (22) to be generated, by a distance equal to a radial dimension of rotary machining tool (20), in a direction normal to the three-dimensional surface, determining tool path constraining surfaces (32) for constraining the tool according to the geometry of the three-dimensional surface, and obtaining three-dimensional curved line equations representing intersection lines (34) between the constraining surfaces (12, 32). Since desired curved surfaces may be used as the tool path constraining surfaces (32), the tool movement path can be suitably determined with high freedom depending upon the geometry of the three-dimensional surface (22) to be generated. The tool movement path data generated from three-dimensional curved line equations have a reduced volume but assure high machining accuracy, as compared with tool movement path data consisting of a multiplicity of cutter location points to which the tool is moved.

23 Claims, 29 Drawing Sheets

FOREIGN PATENT DOCUMENTS

| | | |
|---|---|---|
| 62 169210 A | 7/1987 | (JP) . |
| 63 113609 A | 5/1988 | (JP) . |
| 1 137308 A | 5/1989 | (JP) . |
| 2 260005 A | 10/1990 | (JP) . |
| 4 275605 A | 10/1992 | (JP) . |
| 4 300143 A | 10/1992 | (JP) . |
| 5 289722 A | 11/1993 | (JP) . |
| 5 346814 A | 12/1993 | (JP) . |
| 6 214626 A | 8/1994 | (JP) . |
| 7 136903 A | 5/1995 | (JP) . |

* cited by examiner

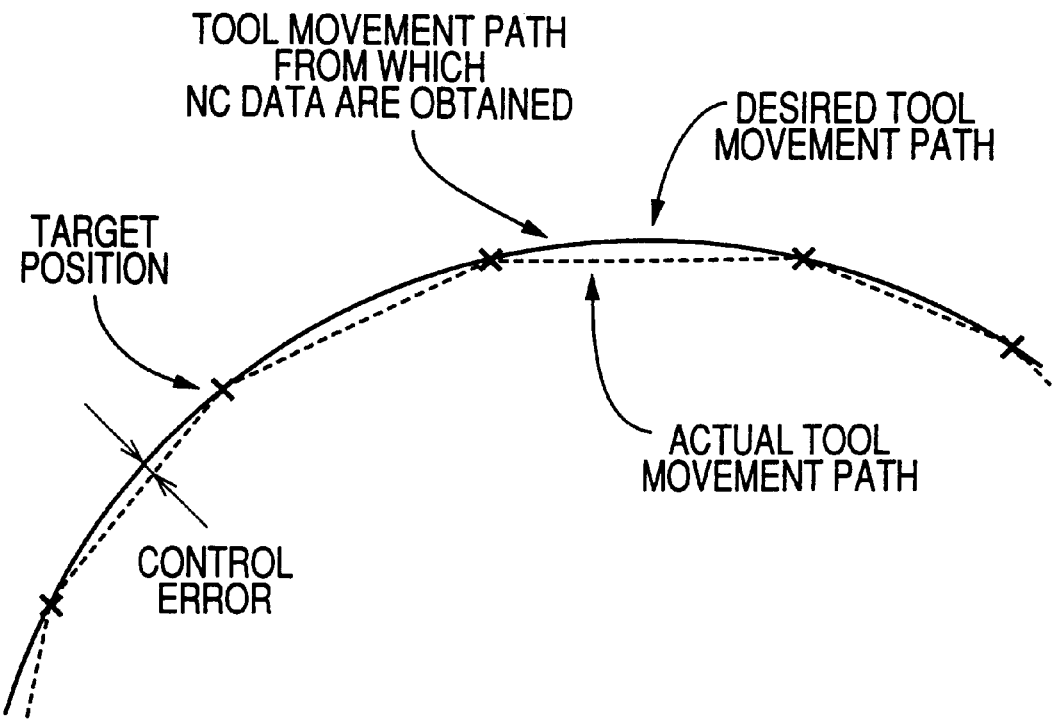
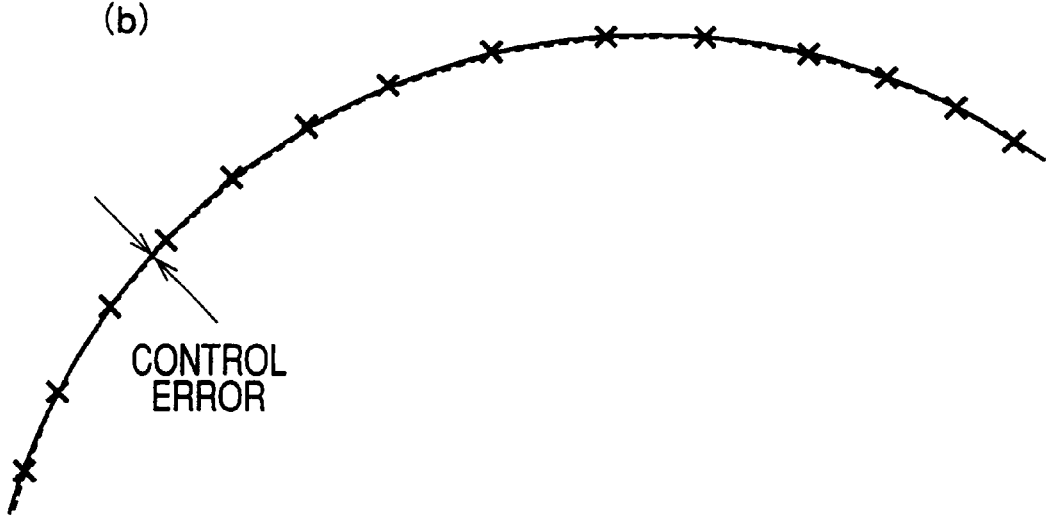
FIG. 12

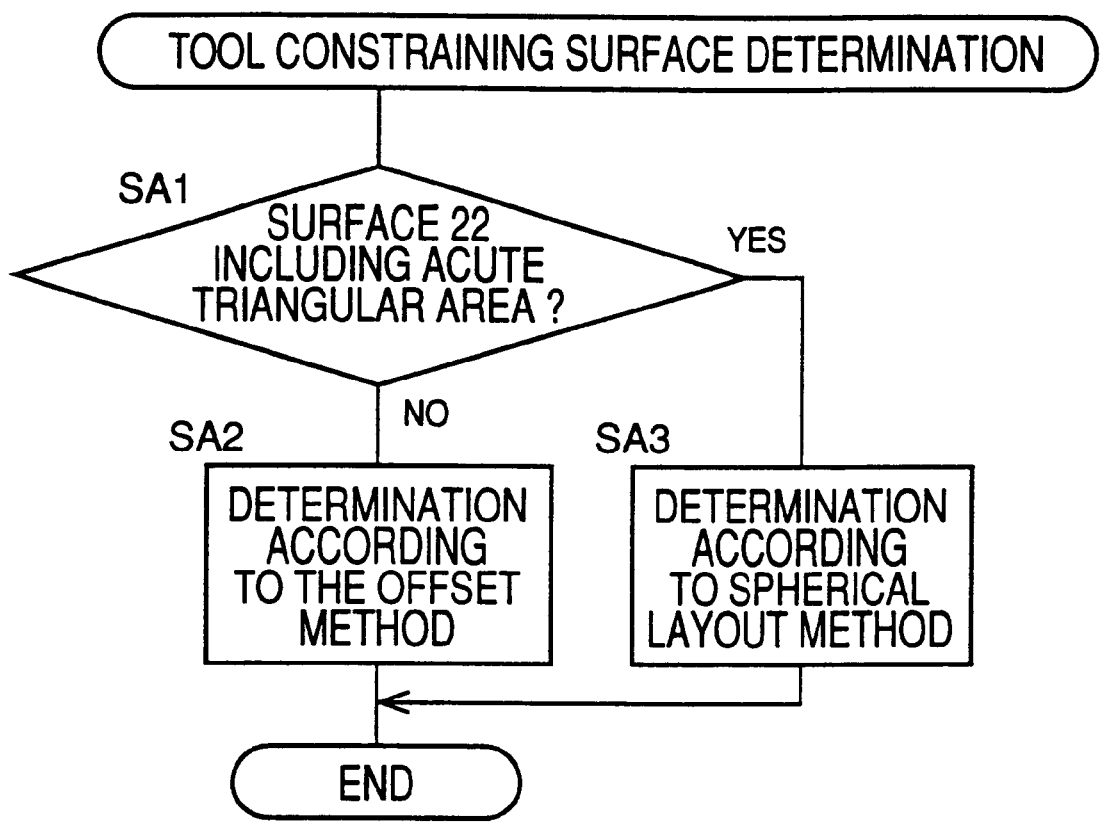
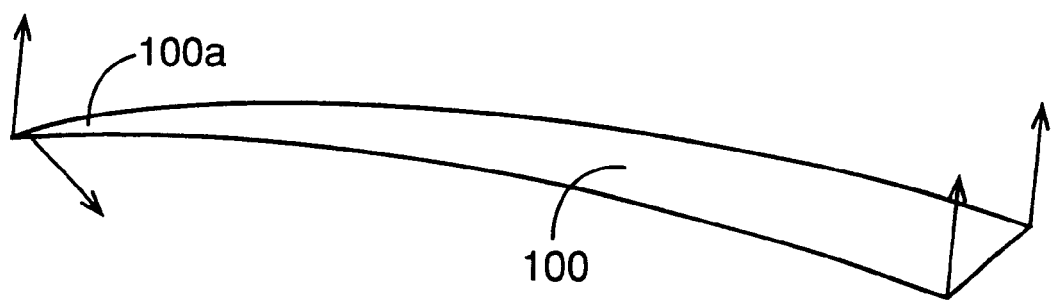

FIG. 26
(a)
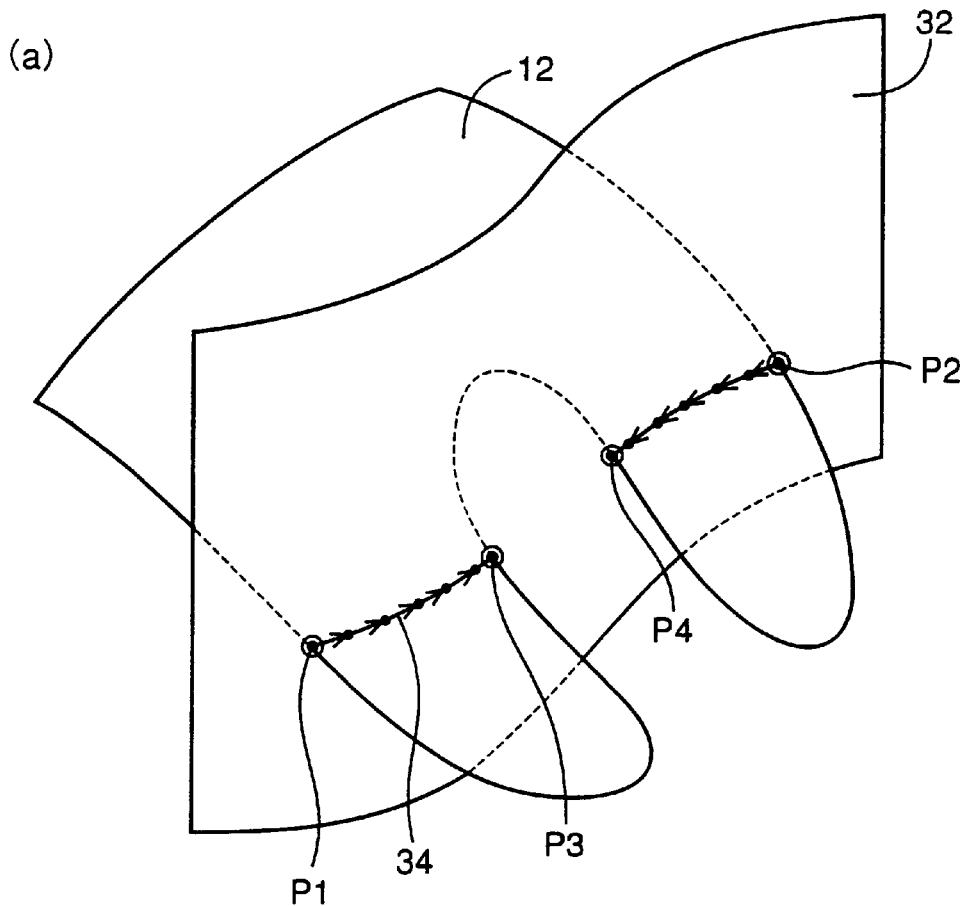
(b)
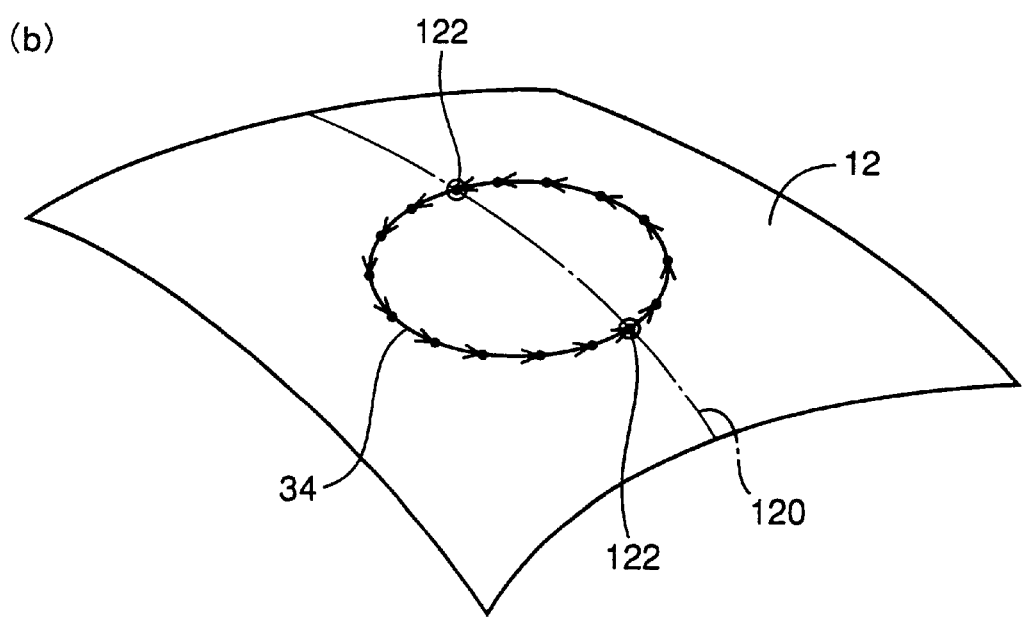

METHOD AND APPARATUS FOR PREPARING DATA ON TOOL MOVING PATH, AND MACHINING METHOD AND SYSTEM

BACKGROUND OF THE INVENTION

1. Field of the Invention

The present invention relates to a method of generating tool movement path data for machining three-dimensional surfaces, a device for generating the data, and machining method and system using the generated data, and more particularly to techniques for suitably determining a tool movement path depending upon the geometry of the three-dimensional surface to be generated by machining.

2. Discussion of the Related Art

It is widely practiced to machine three-dimensional surfaces such as those of a die, by using a machining tool for cutting or grinding, such as a ball end mill and other rotary tools. An example of a method for such machining is disclosed in JP-A-5-346814. This method consists of the steps of: (a) determining a tool constraining surface for constraining a machining tool to machine a three-dimensional surface, the tool constraining surface corresponding to the three-dimensional surface; (b) determining a tool path constraining plane for constraining a movement path of the above-indicated machining tool, such that the tool path constraining plane intersects the above-indicated tool constraining surface; (c) determining as the movement path of the machining tool a line of intersection between the above-indicated tool constraining surface and tool path constraining plane; and (d) moving the machining tool along the determined movement path, relative to the workpiece. FIG. 38 is a view for explaining such a machining method, wherein an NC data generating device 10 such as a CAM device obtains a line of intersection 16 between a tool constraining surface 12 and a tool path constraining plane 14, in the form of a three-dimensional curved line equation, which is supplied to an NC machine tool 18 as NC data (tool movement path data), so that a rotary machining tool 20 is moved along the three-dimensional curved line, for generating a desired three-dimensional surface 22. The tool constraining surface 12 is an offset surface which is offset from the desired three-dimensional surface 22 in a direction normal to the surface 22, by an amount equal to a radial dimension of the rotary machining tool (radius of curvature of the tip of the tool), and the movement path of the machining tool is a movement path taken by the center of the tool (the center of the sphere of the tool tip).

However, the conventional method described above does not necessarily permit adequate determination of the movement path of the machining tool for the three-dimensional surface to be generated by machining, leading to a possibility of drawbacks such as incapability to obtain high machining efficiency, abrupt change in the machining direction of the machining tool, and deterioration of the machining accuracy. Where a three-dimensional surface as shown in FIG. 9, for example, it is desired to smoothly move the tool along waves (follow the geometry) of the three-dimensional surface, as indicated at (a) by broken lines. In the conventional method, however, the tool movement path is constrained within the tool path plane, as indicated at (b) by broken lines, and the determined tool movement path may have abrupt changes in its direction. Where a conical shape as indicated in FIG. 10 is machined, it is desired to effect continuous machining from the small-diameter end to the large-diameter end, by moving the tool along a helical path, as indicated at (a) by broken line. In the conventional method, the machining is effected in steps along paths having respective different diameters, whereby the machining efficiency and accuracy (smoothness of the machine surface) are deteriorated.

Where a three-dimensional surface is machined while the attitude of the machining tool is controlled, the conventional method is adapted to determine the tool path defining points (cutter locations) at a predetermined spacing interval on the intersection line between the tool constraining surface and the tool path constraining plane, and obtain normal vectors of the tool constraining surface at the individual tool path defining points, so that the attitude of the tool is determined based on the obtained normal vectors. This method requires a lot of time to calculate the normal vectors, and suffers from limited freedom in determining the tool path defining points.

The present invention was made in view of the background art described above. It is an object of the present invention to suitably determine a movement path of the tool depending upon the geometry of a three-dimensional surface to be generated by machining. It is another object of the invention to generate tool movement path data including data of the tool attitude, in a short time and with increased freedom in determining the tool path defining points, even where the normal vectors are used to determine the tool attitude.

SUMMARY OF THE INVENTION

The above objects may be achieved according to the present invention, which provides a method of generating tool movement path data for moving a machining tool relative to a workpiece for generating a desired three-dimensional surface, characterized by comprising: (a) a first constraining surface determining step of determining a first constraining surface for constraining the above-indicated machining tool to generate the above-indicated three-dimensional surface, the first constraining surface corresponding to the three-dimensional surface; (b) a second constraining surface determining step of determining a second constraining surface for constraining a movement path of the above-indicated machining tool, the second constraining surface consisting of a surface other than a straight surface and intersecting the above-indicated first constraining surface; (c) an intersection line calculating step of obtaining a three-dimensional curved line equation representing a line of intersection between the above-indicated first and second constraining surfaces; and (d) a movement path data obtaining step of obtaining the movement path data including the above-indicated three-dimensional curved line equation obtained in the intersection line calculating step.

In the present method, the second constraining surface for constraining the movement path of the machining tool can be determined to be a desired curved surface, so that the machining tool is moved along the intersection line between the second constraining surface and the first constraining surface. Thus, the freedom in determining the tool movement path is increased, and the tool movement path can be suitably determined according to the geometry of the three-dimensional surface to be generated. Further, the intersection line between the first and second constraining surfaces is obtained as the three-dimensional curved line equation, and the tool movement path data generated include the three-dimensional curved line equation. Therefore, the tool movement path data have a reduced volume but assure high machining accuracy, as compared with tool movement path data consisting of a multiplicity of cutter location points to which the tool is moved.

The tool movement path data including the three-dimensional curved line equation as described above are used to move the machining tool relative to the workpiece, in a machining device such as an NC machine tool, which is adapted to sequentially determine target positions on the three-dimensional curved line represented by the equation, by circular interpolation, so that the machining tool is moved to the determined target positions.

The machining tool preferably has a machining end portion which has a semi-spherical shape. The shape of the machining end portion includes a shape of a locus taken by the cutting edges during rotation thereof. The machining tool having a semi-spherical shape at the machining end portion may be a ball end mill or an electrical discharge machining electrode. Various other types of machining tools can be used for machining the desired three-dimensional surface by movement of the tool relative to the workpiece along the surface to be generated.

Where the machining end portion has a semi-spherical shape, the first constraining surface is a surface on which the center of the sphere of the semi-spherical machining end portion of the tool is moved. The first constraining surface is preferably a surface which is offset from the three-dimensional surface to be generated, by a distance equal to the radius of the semi-spherical machining end portion of the machining tool. In this case, the tool movement path is a path taken by the center of the sphere of the machining end portion of the machining tool (center of the tool). Basically, the first constraining surface is spaced from the three-dimensional surface to be generated, by a distance between a reference point of the machining tool whose movement is controlled, and a machining point at which the workpiece is actually machined.

The second constraining surface can be determined as desired depending upon the geometry of the three-dimensional surface and the functions of the machining device used, or so as to facilitate the machining operation or perform the machining operation with high accuracy. Where an NC machine tool having mutually perpendicular three axes, the second constraining surface is desirably a curved surface which is parallel to the Z axis and is curved in the X-Y plane.

Tool movement path is a path of relative movement between the machining tool and the workpiece, and does not necessarily mean a path taken by the machining tool moved relative to the stationary workpiece.

Where the tool movement path data are used for an NC machine tool or other machining device capable of controlling the attitude of the machining tool with respect to the workpiece, the method preferably further comprises (a) a normal vector calculating step of obtaining normal vectors of the above-indicated first constraining surface on the intersection line between the above-indicated first and second constraining surfaces, at a predetermined spacing interval; and (b) a normal curved line calculating step of obtaining a three-dimensional curved line equation representing a smooth normal curved line passing end portions of the normal vectors, in relation to the intersection line between the above-indicated first and second constraining surfaces. In this case, (c) the above-indicated movement path data obtaining step is adapted to generate the tool movement path data including the three-dimensional curved line equation of the intersection line between the above-indicated first and second constraining surfaces, and the three-dimensional curved line equation of the above-indicated normal curved line so that the tool movement path data include data indicative of an attitude of the above-indicated machining tool. In this case, the machining operation can be performed by moving the machining tool such that the axis of the tool (attitude of the tool relative to the workpiece) is held substantially perpendicular or inclined by a desired angle with respect to the three-dimensional surface to be generated. Accordingly, where a cutting operation is performed by a ball end mill or other rotary cutting tool, the present arrangement is effective to eliminate a variation in the machining accuracy (surface roughness) due to a change in the tool attitude relative to the three-dimensional surface, and permits the machining by a radially outer portion of the tool at which the peripheral cutting speed is higher, so that the machining performance is improved. Thus, the three-dimensional surface can be machined with further improved accuracy. Further, the present arrangement permits machining of a complicated geometry such as an undercut. It is also noted that since the smooth normal curved line passing the end points of the normal vectors is obtained as the three-dimensional curved line equation, the time required for calculating the normal vectors can be reduced by reducing the number of the normal vectors. In addition, the normal vectors of the first constraining surface at the target positions sequentially set on the three-dimensional curved intersection line between the first and second constraining surfaces can be obtained from the normal curved line, whereby the target positions can be determined as desired depending upon the required accuracy. Further, the volume of the tool movement path data generated according to the present arrangement is considerably reduced as compared with that of the tool movement path data which are conventionally generated by determining the normal vectors corresponding to a multiplicity of tool path defining points (cutter location points).

In the normal vector calculating step, it is preferable to obtain the normal vectors at the spacing interval which depends upon the curvature of the intersection line between the first and second constraining surfaces, for example. More specifically, it is desirable to determine the spacing interval such that the interval is relatively short for a portion of the intersection line which has a relatively large curvature, and is relatively long for a portion of the intersection line which has a relatively small curvature. This arrangement permits reduction in the number of the normal vectors to be calculated, while maintaining high accuracy of the normal curved line obtained in the normal curved line calculating step. Further, since the three-dimensional curved line equation of the normal curved line is obtained in relation to the three-dimensional curved line equation of the intersection line between the first and second constraining surfaces, the normal direction at a selected point on the intersection line can be calculated as a line, without recognition of a surface, based on only the three-dimensional curved line of the normal curved line. Those three-dimensional curved equations of the intersection line and the normal curved line are retained (stored) in relation to each other.

The intersection line between the above-indicated first and second constraining surfaces may be obtained as an equation representing a three-dimensional curved line such as NURBS, B-Spline or Bezier curve, based on equations representing the first and second constraining surfaces, so that the intersection line does not lose geometrical characteristics (tangential continuity and curvature continuity) of the second constraining surface. Where there exists two points of intersection between the edge of the above-indicated first constraining surface and the above-indicated second constraining surface, it is desirable to obtain the three-dimensional curved line equation of the intersection line between the first and second constraining surfaces, according to a patch boundary method. Where the number of the intersecting points is not equal to two, it is desirable to obtain the three-dimensional curved line equation of the intersection line between the first and second constraining surfaces, according to a geometrical intersection tracing method.

According to the patch boundary method, the three-dimensional curved line equation is obtained by determining the magnitudes and directions of tangent vectors at the opposite end points of the intersection line. If an error of the line of the obtained equation with respect to the intersection line is larger than a predetermined tolerance (permissible amount of the error), a new point (segment end point) is provided at an intermediate position of the intersection line, to increment the number of the segments of the intersection line (minimum units of the three-dimensional curved line), for eventually obtaining the three-dimensional curved line equation having a desired accuracy. This patch boundary method has a higher processing speed and a smaller number of the segments, than the geometrical intersection tracing method. Further, where the two intersection points exist, the intersection line usually exists between these two points, and therefore, it is not necessary to effect a determination as whether the intersection line exists. That is, the two intersection points can be considered to define the opposite ends of the intersection line.

An example of the geometrical intersection tracing method is disclosed in JP-A-2-230406. According to this method, three-dimensional curved lines are sequentially obtained by determining the amount of tracing of the intersection line in the tangential direction at the individual intersection points used as reference points. The tracing amount is changed so as to obtain a desired accuracy of tracing of the intersection line. This method has a lower processing speed and a larger number of the segments than the patch boundary method. However, since the processing is initiated from one of the intersection points, the geometrical intersection tracing method can deal with a case where three or more intersection point exist or a case where the intersection line is complicated. Where there does not exist an intersection line with the intersection line being a loop, a parameter constant line is provided on the first constraining surface to determine reference points used to effect the tracing operation.

In another preferred form of the present invention, (a) the above-indicated machining tool has a machining end portion having a semi-spherical shape, and the above-indicated first constraining surface constrains a center of a sphere of the above-indicated semi-spherical machining end portion, and (b) the above-indicated first constraining surface determining step comprises determining a multiplicity of reference points on the above-indicated three-dimensional surface at a predetermined spacing interval, locating spheres having a radius equal to that of the above-indicated semi-spherical machining end portion of the above-indicated machining tool, in alignment with centers of the reference points, respectively, and defining the above-indicated first constraining surface based on segments of spherical surfaces of the spheres which are most distant from the three-dimensional surface. That is, the first constraining surface is generally obtained by obtaining normal vectors of the three-dimensional surface to be generated, such that the first constraining surface is offset from the three-dimensional surface in the direction normal to the three-dimensional surface, by an amount equal to a radial dimension of the machining tool (radius of curvature of the end portion of the machining tool). Where the three-dimensional surface is an acute triangular surface having a small acute angle, the accuracy of the normal vectors at the actuate portion of the surface. In this case, the offset method does not assure sufficiently high accuracy, and therefore it is desirable to determine the first constraining surface according to the spherical layout method in which the multiple spheres are located as described above. An example of the spherical layout method is a technique disclosed in Japanese Patent Application 8-21008 filed in the name of the present applicant. This method permits high accuracy of determination of the first constraining surface which is spaced from the desired three-dimensional surface by the radial dimension of the machining tool, even in the case where the normal vectors cannot be otherwise obtained with high accuracy for an acute triangular surface, for example.

In a further preferred form of the invention, (a) the above-indicated machining tool has a machining end portion having a semi-spherical shape, and the above-indicated first constraining surface constrains a center of a sphere of the above-indicated semi-spherical machining end portion, and wherein the three-dimensional curved line equation of the intersection line between the above-indicated first and second constraining surfaces is obtained by one of three calculating methods consisting of a first method, a second method and a third method, (b) the above-indicated first method being practiced where it is determined that a normal direction of the three-dimensional surface to be generated can be correctly recognized, the above-indicated first method comprising obtaining normal vectors of the above-indicated three-dimensional surface and determining as the above-indicated first constraining surface an offset surface which is offset from the above-indicated three-dimensional surface in the normal direction by a distance equal to a radius of the above-indicated semi-spherical machining end portion of the above-indicated machining tool, in the above-indicated first constraining surface determining step, the above-indicated first method further comprising obtaining the three-dimensional curved line equation of the intersection line between the above-indicated first and second constraining surfaces according to a patch boundary method, in the above-indicated intersection line calculating step, where there exist two points of intersection between an edge of the above-indicated first constraining surface and the above-indicated second constraining surface, (c) the above-indicated second method being practiced where it is determined that the normal direction of the three-dimensional surface to be generated can be correctly recognized, the above-indicated second method comprising obtained normal vectors of the above-indicated three-dimensional surface and determining as the above-indicated first constraining surface an offset surface which is offset from the above-indicated three-dimensional surface in the normal direction by a distance equal to the radius of the above-indicated semi-spherical machining end portion of the above-indicated machining tool, in the above-indicated first constraining surface determining step, the above-indicated second method further comprising obtaining the three-dimensional curved line equation of the intersection line between the above-indicated first and second constraining surfaces according to a geometrical intersection tracing method, in the above-indicated intersection line calculating step, where the number of the above-indicated points of intersection between the edge of the above-indicated first constraining surface and the above-indicated second constraining surface, (d) the above-indicated third method being practiced where it is determined that the normal direction cannot be correctly recognized in at least a portion of the above-indicated three-dimensional surface to be generated, the above-indicated third method comprising determining a multiplicity of reference points on the above-indicated three-dimensional surface at a predetermined spacing interval, locating spheres having a radius equal to that of the semi-spherical machining end portion of the above-indicated machining tool, in alignment with centers of the reference points, respectively, and defining the above-indicated first constraining surface based on segments of spherical surfaces of the spheres which are most distant from the three-dimensional surface, in the above-indicated first constraining surface determining step, the above-indicated third method further comprising obtaining the three-dimensional curved line equation of the intersection line between the above-indicated first and second constraining surfaces in a predetermined calculating manner, in the above-indicated intersection line calculating step. In this form of the invention, if an error is constituted in the above-indicated one of the above-indicated three methods, the three-dimensional curved line equation is obtained according to another of the above-indicated three methods. Namely, the three calculating methods are selectively used depending upon the geometry (characteristic) of the three-dimensional surface to be generated, and the number of the intersection points between the edge of the first constraining surface and the second constraining surface. Accordingly, the three-dimensional curved line equation can be obtained in a minimum length of time. Further, if the calculation according to one of the methods is not possible due to an error or if the result of the calculation is not acceptable, the other method or methods is/are tried to obtain the three-dimensional curved line equation. Thus, the number of the three-dimensional curved line equations that can be obtained is increased.

The individual steps in the present invention are desirably performed automatically by using a computer in which are entered information necessary for processing, such as information on the three-dimensional surface to be generated, and the machining tool and a machining device used. While the second constraining surface can be automatically determined depending upon the geometry of the first constraining surface and the type of the machining device used, for example, the second constraining surface may be determined by manual operations by the operator.

The method according to the present invention may be suitably practiced by a tool movement path data generating device for generating tool movement path data for moving a machining tool relative to a workpiece for generating a desired three-dimensional surface, characterized by comprising: (a) first constraining surface determining means for determining a first constraining surface for constraining the above-indicated machining tool to generate the above-indicated three-dimensional surface, the above-indicated first constraining surface corresponding to the above-indicated three-dimensional surface; (b) second constraining surface determining means for determining a second constraining surface for constraining a movement path of the above-indicated machining tool, the above-indicated second constraining surface consisting of a surface other than a straight surface and intersecting the above-indicated first constraining surface; (c) intersection line calculating means for obtaining a three-dimensional curved line equation representing a line of intersection between the above-indicated first and second constraining surfaces; and (d) movement path data generating means for obtaining the above-indicated movement path data including data three-dimensional curved line equation obtained by the above-indicated intersection line obtaining means.

According to the present invention, there is provided a method suitable for machining a workpiece to generate a desired three-dimensional surface by moving machining tool relative to the workpiece, characterized by comprising: (a) a first constraining surface determining step of determining a first constraining surface for constraining the above-indicated machining tool to generate the above-indicated three-dimensional surface, the above-indicated first constraining surface corresponding to the above-indicated three-dimensional surface; (b) a second constraining surface determining step of determining a second constraining surface for constraining a movement path of the above-indicated machining tool, the above-indicated second constraining surface consisting of a surface other than a straight surface and intersecting the above-indicated first constraining surface; (c) an intersection line calculating step of obtaining a three-dimensional curved line equation representing a line of intersection between the above-indicated first and second constraining surfaces; (d) a movement path determining step of determining the movement path of the machining tool by using the above-indicated three-dimensional curved line equation obtained in the above-indicated intersection line obtaining step; and (e) a tool moving step of determining successive target positions on the movement path which is determined in the above-indicated movement path determining step and which is a three-dimensional curved line represented by the above-indicated three-dimensional curved line equation, and moving the above-indicated machining tool relative to the above-indicated workpiece.

According to the present invention, there is provided a machining system suitable for machining a workpiece to generate a desired three-dimensional surface by moving machining tool relative to the workpiece, characterized by comprising: (a) first constraining surface determining means for determining a first constraining surface for constraining the above-indicated machining tool to generate the above-indicated three-dimensional surface, the above-indicated first constraining surface corresponding to the above-indicated three-dimensional surface; (b) second constraining surface determining means for determining a second constraining surface for constraining a movement path of the above-indicated machining tool, the above-indicated second constraining surface consisting of a surface other than a straight surface and intersecting the above-indicated first constraining surface; (c) intersection line calculating means for obtaining a three-dimensional curved line equation representing a line of intersection between the above-indicated first and second constraining surfaces; (d) movement path determining means for determining the movement path of the machining tool by using the above-indicated three-dimensional curved line equation obtained in the above-indicated intersection line obtaining step; and (e) tool movement control means for determining successive target positions on the movement path which is determined in the above-indicated movement path determining step and which is a three-dimensional curved line represented by the above-indicated three-dimensional curved line equation, and moving the above-indicated machining tool relative to the above-indicated workpiece.

To reduce the tool movement path data including tool attitude data for determining the attitude of the machining tool using normal vectors and to facilitate the determination of tool path defining points, there is provided a method of generating tool movement path data for moving a machining tool relative for generating a desired three-dimensional surface, the method comprising: (a) a first constraining surface determining step for determining a first constraining surface for constraining the above-indicated machining tool to generate the above-indicated three-dimensional surface, the first constraining surface corresponding to the above-indicated three-dimensional surface; (b) a second constraining surface determining step of determining a second constraining surface for constraining a movement path of the above-indicated machining tool, the second constraining surface consisting of a straight or curved surface and intersecting the above-indicated first constraining surface; (c) an intersection line calculating step of obtaining a line of intersection between the above-indicated first and second constraining surfaces; (d) a normal vector calculating step of obtaining normal vectors of the above-indicated first constraining surface on the intersection line between the above-indicated first and second constraining surfaces, at a predetermined spacing interval; (e) a normal curved line calculating step of obtaining a smooth normal curved line passing end points of the normal vectors; and (f) a movement path data obtaining step of generating the movement path data including data representing an attitude of the above-indicated machining tool, based on the intersection line between the above-indicated first and second constraining surfaces and the above-indicated normal curved line.

In the above case, the machining operation can be performed by moving the machining tool such that the axis of the tool (attitude of the tool relative to the workpiece) is held substantially perpendicular or inclined by a desired angle with respect to the three-dimensional surface to be generated. Accordingly, where a cutting operation is performed by a ball end mill or other rotary cutting tool, the present arrangement is effective to eliminate a variation in the machining accuracy (surface roughness) due to a change in the tool attitude relative to the three-dimensional surface, and permits the machining by a radially outer portion of the tool at which the peripheral cutting speed is higher, so that the machining performance is improved. Thus, the three-dimensional surface can be machined with further improved accuracy. Further, the present arrangement permits machining of a complicated geometry such as an undercut. It is also noted that since the smooth normal curved line passing the end points of the normal vectors is obtained as the three-dimensional curved line equation, the time required for calculating the normal vectors can be reduced by reducing the number of the normal vectors. In addition, the normal vectors of the first constraining surface at the tool path defining points set on the three-dimensional curved intersection line between the first and second constraining surfaces can be obtained from the normal curved line, whereby the tool path defining points can be determined as desired depending upon the required accuracy.

In the above case, the second constraining surface need not be a curved surface, but may be a straight surface. Further, the intersection line between the first and second constraining surfaces and the normal curved line need not be represented by curved line equations, but may be graphical data.

BRIEF DESCRIPTION OF DRAWINGS

FIG. 12 is a view illustrating a movement path of a rotary machining tool in the NC machine tool of FIG. 1.

FIG. 14 is a flow chart illustrating an example of step S1 in FIG. 4.

FIG. 15 is a view showing one example of an acute triangular surface.

FIG. 26 is a view illustrating one example of a case where three-dimensional curved line equations of the line of intersection between the tool constraining surface and the tool path constraining surface are obtained according to a geometrical tracing method.

SUMMARY OF THE INVENTION

Figure 1:
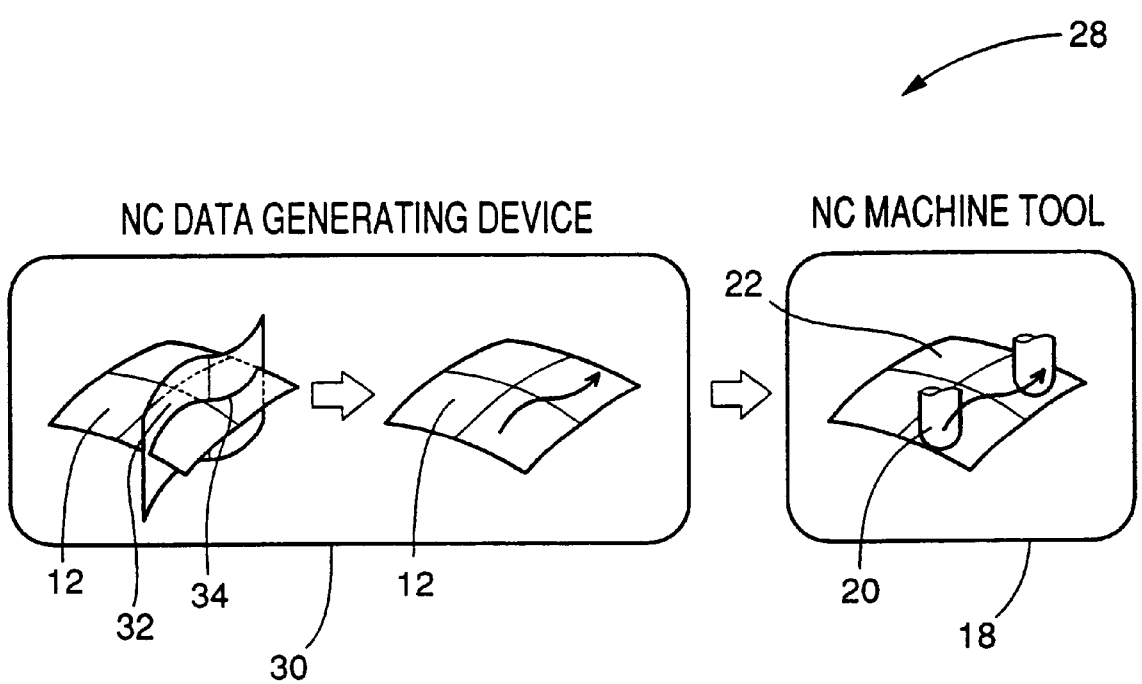
FIG. 1 is a schematic view illustrating an example of a a machining system adapted to generate tool movement path data according to a tool movement path data generating method according to the present invention.

There will be described in detail embodiments of this invention referring to the drawings.

Figure 38:
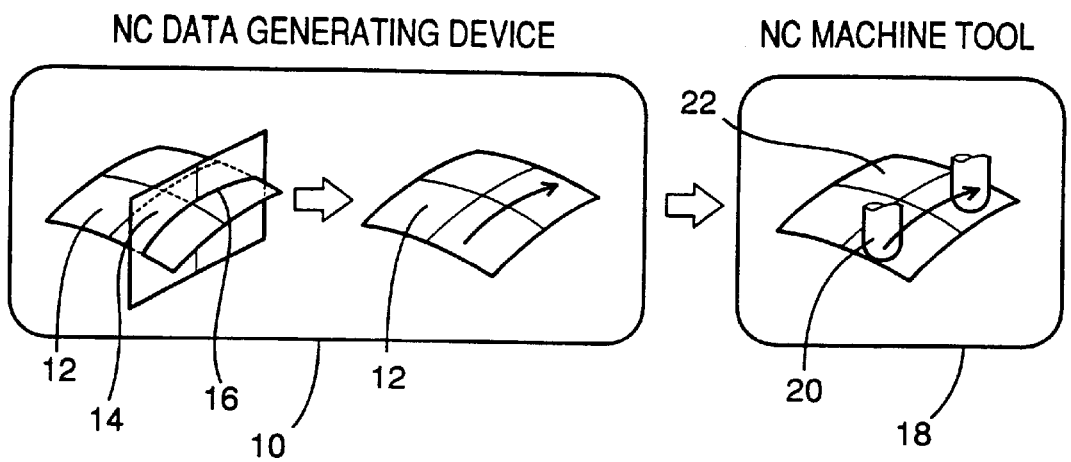
FIG. 38 is a view illustrating one example of a conventional NC machining system.

Referring to the view of FIG. 1 which schematically illustrates an NC machining system 28 according to an embodiment of this invention and which corresponds to that of FIG. 38, an NC data generating device 30 which functions as a tool path data generating device is adapted to generate NC data, using a tool path constraining surface 32 in place of the tool path constraining plane 14 used by the NC data generating device 10 of FIG. 38. The NC data include tool path data in the form of three-dimensional curved line equations representative of lines of intersections 34 between a tool constraining surface 12 and the tool path constraining surfaces 32, so that a rotary machining tool 20 of the NC machine tool 18 is moved along the curved lines represented by the three-dimensional curved line equations, without the tool path being constrained within planes.

Figure 2:
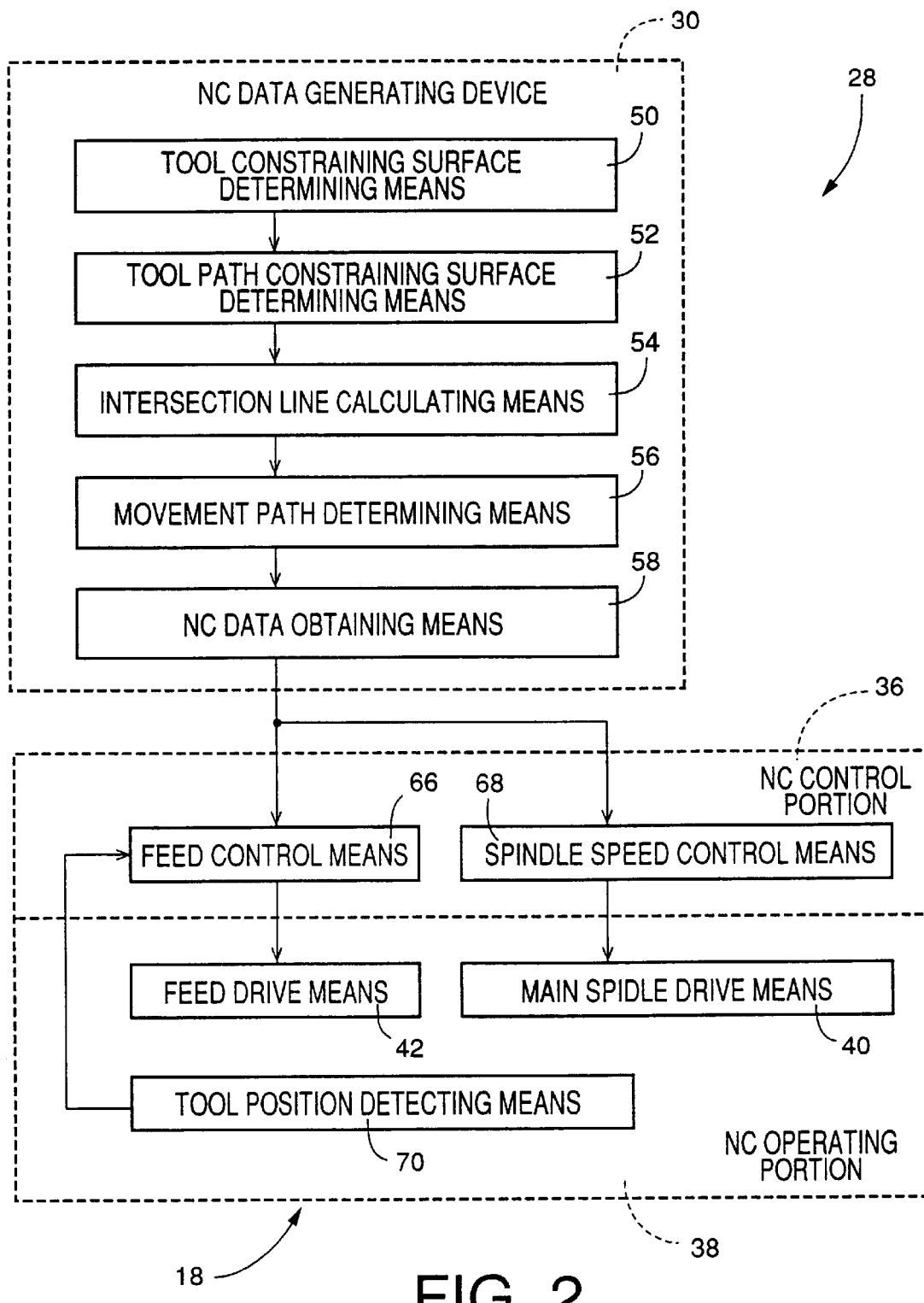
FIG. 2 is a block diagram illustrating functions of the machining system of FIG. 1.
Figure 3:
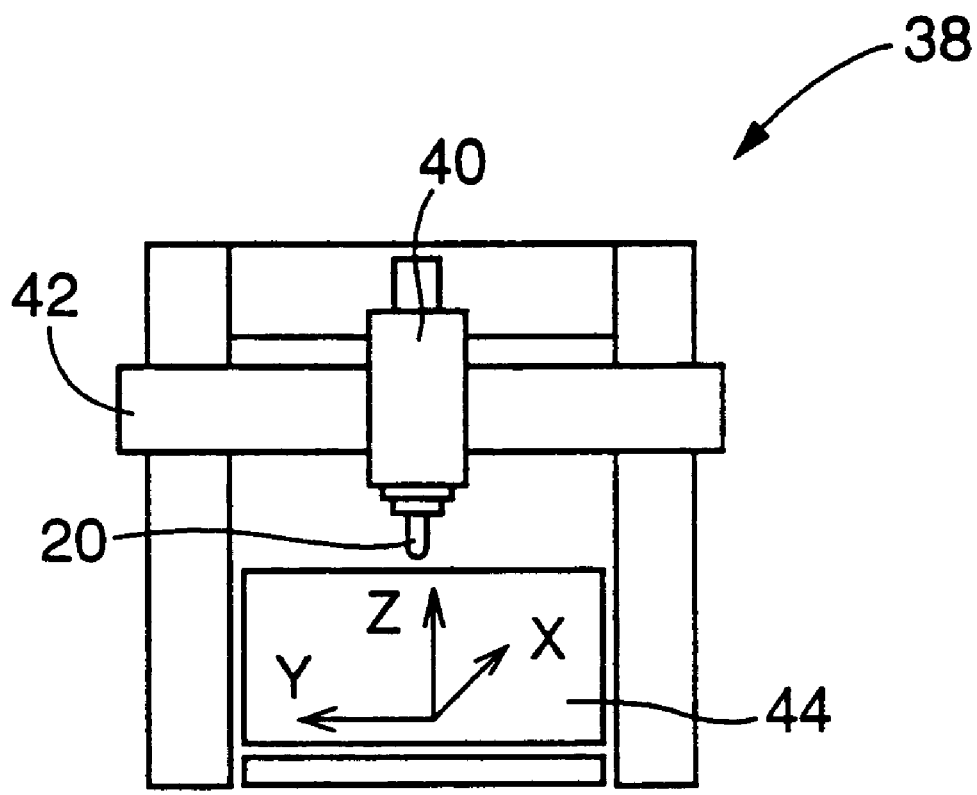
FIG. 3 is a view illustrating an NC operating portion of an NC machine tool in the machining system of FIG. 1.

Referring to the functional block diagram of FIG. 2 of the NC machining system 28 of FIG. 1, the NC data generated by the NC data generating device 30 are supplied to the NC machine tool 18, through a data storage medium such as a magnetic tape or disk or an on-line computer. The NC machine tool 18 is provided with an NC control portion 36 and an NC operating portion 38. For example, the NC operating portion 38 has the rotary machining tool 20 such as a ball end mill, main spindle drive means 40 and feed drive means 42, as shown in FIG. 3. The rotary machining tool 20 has cutting edges which takes a semi-spherical locus when the tool is rotated. The main spindle drive means 40 is adapted to rotate the rotary machining tool 20 about an axis thereof parallel to a Z axis, and the feed drive means 42 is adapted to move the rotary machining tool 20 three-dimensionally along an X axis, a Y axis and the Z axis, which are perpendicular to each other. The rotary cutting tool 20 is moved relative to a workpiece 44 according to the NC data while the tool 20 is rotated about its axis, so that the workpiece 44 is machined to generate a desired shape such as a three-dimensional curved surface.

Figure 4:
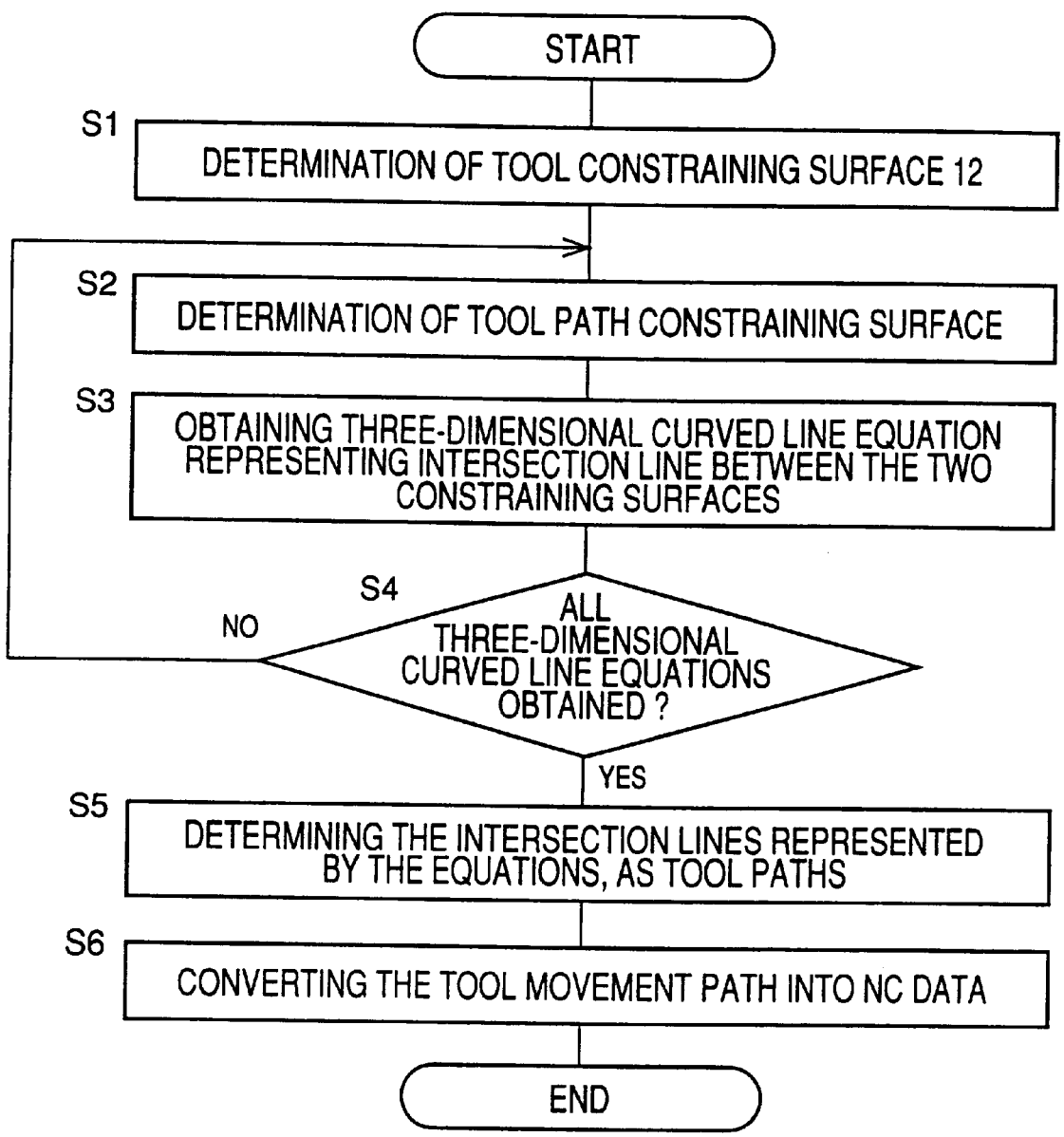
FIG. 4 is a flow chart illustrating an operation of an NC data generating device in the machining system of FIG. 1.
Figure 5:
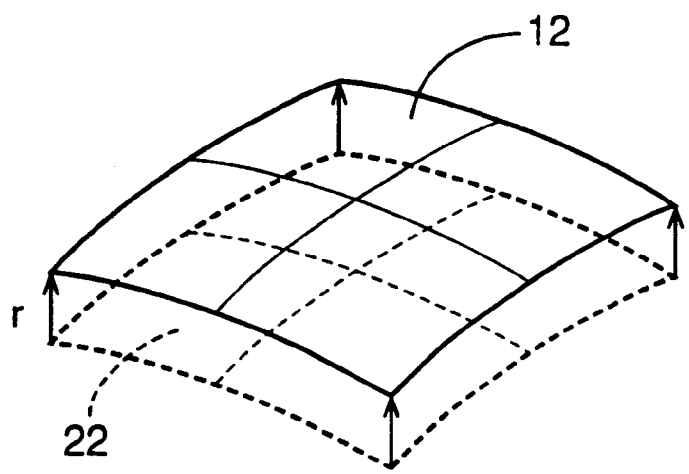
FIG. 5 is a view illustrating a content of step S1 of FIG. 4.

The NC data generating device 30 includes a CAM device incorporating a CPU, a RAM and a ROM, and has functional means in the form of tool constraining surface determining means 50, tool path constraining surface determining means 52, intersection line calculating means 54, movement path determining means 56 and NC data obtaining means 58. The NC data generating device 30 is adapted to generate the NC data according to a flow chart illustrated in FIG. 4. Step S1 of FIG. 4 is implemented by the tool constraining surface determining means 50, to determine the tool constraining surface 12. For example, the tool constraining surface determining means 50 is adapted to obtain normal vectors of a three-dimensional surface 22 to be generated by machining, for obtaining an offset surface which is offset from the three-dimensional surface 22 in a direction normal to the surface 22, by an amount equal to a radial dimension r of the rotary machining tool 20 (radius of curvature of the tip of the tool), as shown in FIG. 5. The tool constraining surface 12 is a surface on which a reference point of the rotary machining tool 20 should be moved to generate the three-dimensional surface 22. The reference point is the center of the tool 20, which is the center of a spherical locus described by the cutting edges of the tool 20 during rotation thereof. The three-dimensional surface 22 to be generated is predetermined, while the radial dimension r of the rotary machining tool 20 is specified by the operator. The tool constraining surface 12 corresponds to a first constraining surface, and the step S1 corresponds to a first constraining surface determining step, while the tool constraining surface determining means 50 corresponds to first constraining surface determining means.

Figure 6:
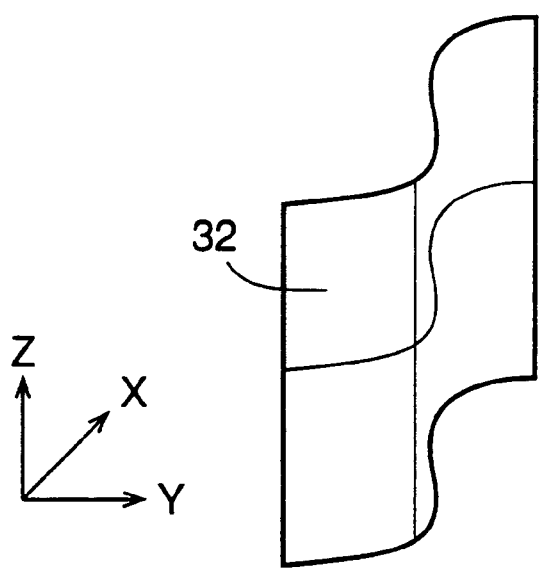
FIG. 6 is a view illustrating a content of step S2 of FIG. 4.

Step S2 is implemented by the tool path constraining surface determining means 52 to determine the tool path constraining surface 32 intersecting the tool constraining surface 12, based on data input operations by the operator through data input means such as a keyboard and a mouse. The tool path constraining surface 32 constrains a movement path to be taken by the rotary machining tool 20. The tool path constraining surface 32 may be determined as desired based on the geometry of the three-dimensional surface 22 to be generated. In the present embodiment wherein the NC machine tool 18 has the mutually perpendicular three axes, it is preferred to determine the tool path constraining surface 32 which is parallel to the Z axis about which the rotary machining tool 20 is rotated and which has a predetermined curvature in the X-Y plane, as indicated in FIG. 6. The tool path constraining surface 32 may be a plane or straight surface as well as a curved surface. The tool path constraining surface 32 corresponds to a second constraining surface, and the step S2 corresponds to a second constraining surface determining step, while the tool path constraining surface determining means 52 corresponds to a second constraining surface determining means.

Step S3 is implemented by the intersection line calculating means 54 to calculate a line of intersection 34 between the above-indicated tool constraining surface 12 and tool path constraining surface 32. The intersection line 34 is obtained as an equation representing a three-dimensional curved line such as NURBS, B-Spline or Bezier curve, based on equations representing the surfaces 12 and 32, so that the intersection line 34 does not lose geometrical characteristics (tangential continuity and curvature continuity) of the tool path constraining surface 32. This step S3 corresponds to an intersection line calculating step, and the intersection line calculating means 54 corresponds to intersection line obtaining means.

Figure 7:
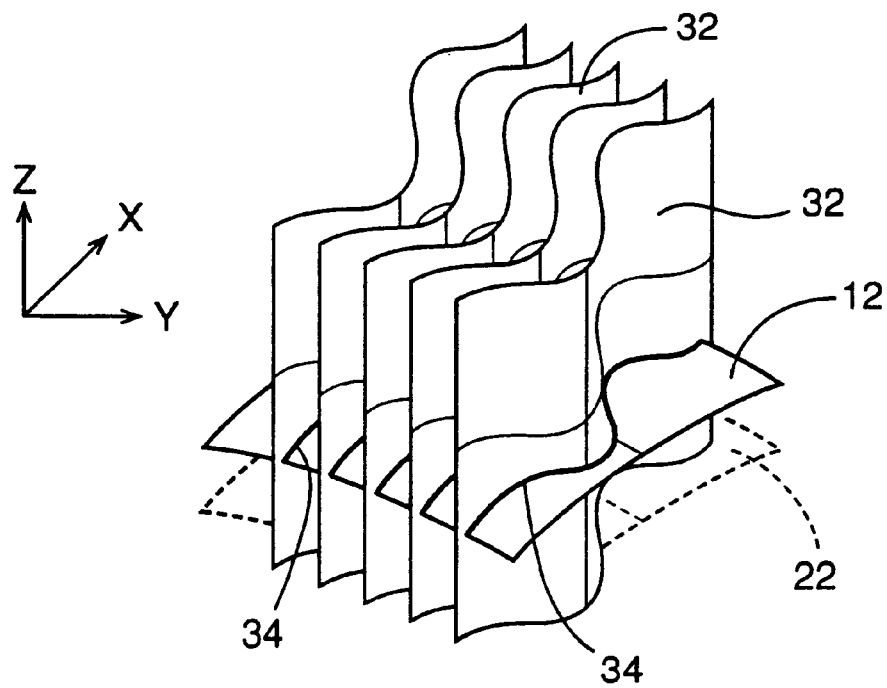
FIG. 7 is a view illustrating a content of step S3 of FIG. e4.

Step S4 is provided to determine whether all the three-dimensional curved line equations necessary to generate the three-dimensional surface 22 have been obtained. The steps S2 and S3 are repeatedly implemented with the tool path constraining surface 32 being incrementally shifted by a predetermined distance in the direction perpendicular to the Z axis, as indicated in FIG. 7, until all the three-dimensional curved line equations have been obtained. Thus, the three-dimensional curved line equations representing all the intersection lines 34 between the tool constraining surface 12 and the tool path constraining surface 32. This step S4 is also automatically implemented by the intersection line calculating means 54.

Figure 8:
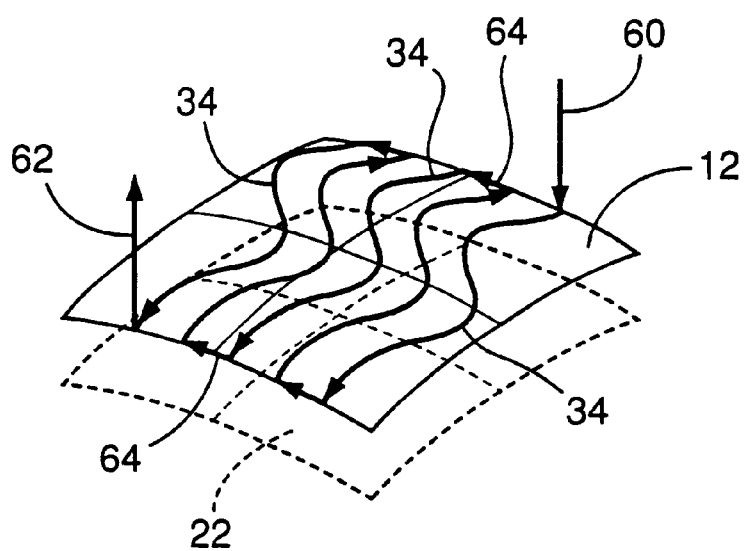
FIG. 8 is a view illustrating a content of step S5 * of FIG. 4.

After all of the three-dimensional curved line equations have been obtained, step S5 is implemented. This step S5 is implemented by the movement path determining means 56, to determine not only a tool movement path based on the three-dimensional curved line equations representing the plurality of intersection lines 34, but also tool movement directions, an approaching movement 60, a retracting movement 62 and transverse incremental feed movements 64, as indicated in FIG. 8. The movements 60, 62, 64 are also required to effect a machining operation. The tool movement path is a path which is taken by the center of the tool (center of the sphere of the tip of the tool tip). Then, step S6 is implemented by the NC data obtaining means 58, to convert the determined tool movement path into the NC data, namely, tool movement path data in the form of codes to be applied to the NC control portion of the NC machine tool 18. The NC data also include information relating to the rotating speed of the rotary machining tool 20. The above-indicated steps S5 and S6 correspond to a movement path data generating step recited in claim 1, and the step S5 corresponds to a movement path determining step recited in claim 9. The movement path determining means 56 and the NC data obtaining means 58 correspond to movement path data generating means recited in claim 8, and the movement path determining means 56 corresponds to movement path determining means recited in claim 10.

It is noted that the NC data need not be generated in one processing operation for the entirety of the surface or surfaces of the workpiece to be machined, but may be generated in different processing operations for different surface areas of the workpiece. In the latter case, the surface or surfaces is/are divided into a plurality of portions having different characteristics, and each of these portions is treated as the three-dimensional surface 22, for which the NC data are generated.

Referring back to FIG. 2, the NC control portion 36 of the above-indicated NC machine tool 18 includes a microcomputer incorporating a CPU, a RAM and a ROM, and is adapted to control the operation of the NC operating operating portion 38 according to the NC data generated by the NC data generating device 30. The NC control portion 36 has functional means in the form of feed control means 66 and spindle speed control means 68. The feed control means 66 controls the feed drive means 42 for feeding the rotary machining tool 20 along the tool movement path represented by the NC data, namely, according to three-dimensional curved line equations, in a circular interpolation mode. Described in detail, the feed control means 66 sequentially determines, with a predetermined control cycle time, successive target positions lying on the curved line represented by each three-dimensional curved line equation indicated above, and controls the feed drive means 42 in a feedback manner, so as to linearly move the rotary machining tool 20 to the determined target positions. The feed control means 66 receives from tool position detecting means 70 a signal indicative of the actual position of the tool. The spindle speed control means 68 is adapted to control the above-indicated main spindle drive means 40 for rotating the rotary machining tool 20 about its axis at a rotating speed specified by the NC data.

As described above, the rotary cutting tool 20 is fed along the curves represented by the three-dimensional curved line equations while the tool 20 is rotated about its axis, whereby the workpiece 44 is machined to generate the A desired three-dimensional surface, according to the NC data. This step is a tool moving step recited in claim 9, and the NC machine tool 18 corresponds to tool movement control means recited in claim 10.

Figure 9:
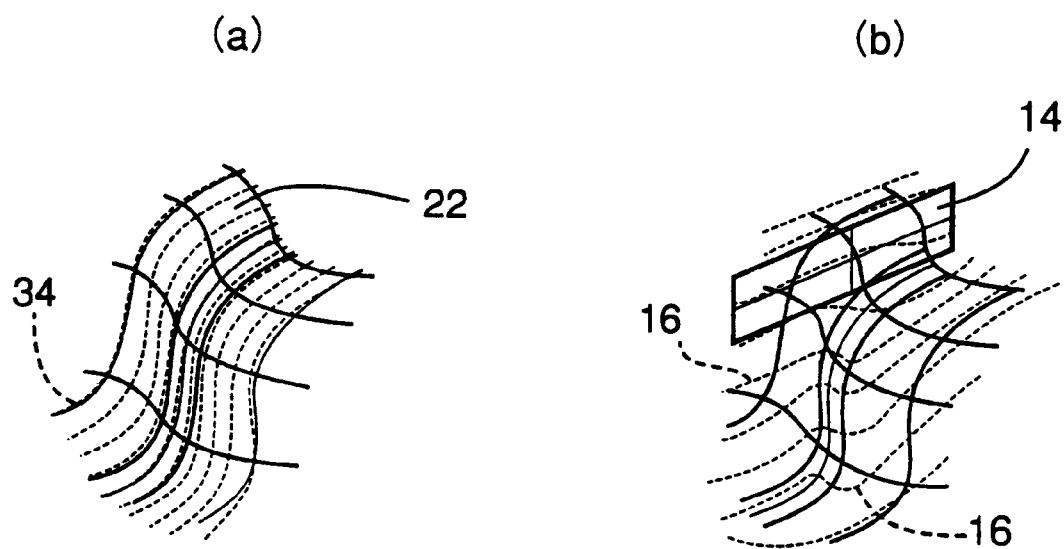
FIG. 9 is a view illustrating one example of a three-dimensional surface that can be suitably machined by the machining system of FIG. 1.
Figure 10:
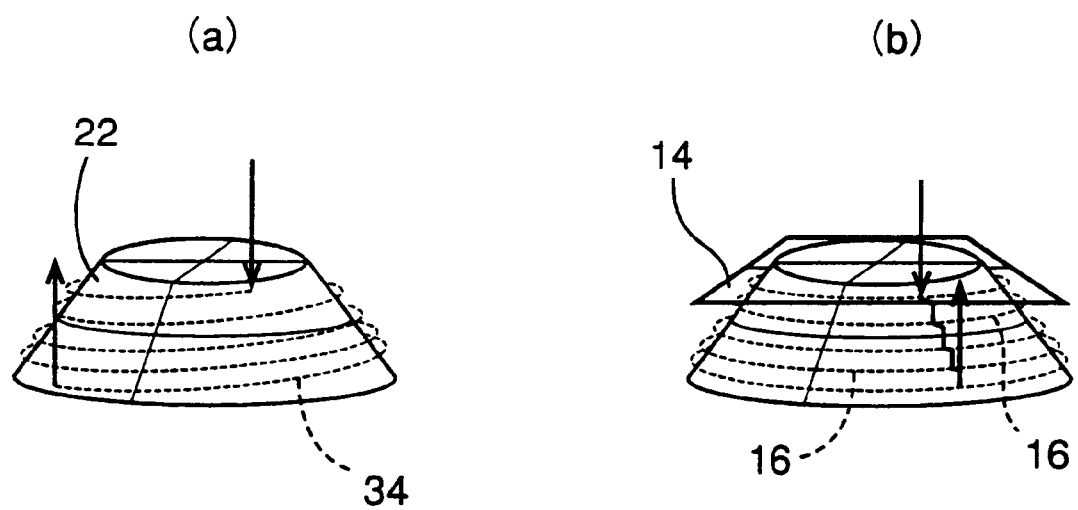
FIG. 10 is a view illustrating another example of a three-dimensional surface that can be machined by the machining system of FIG. 1.
Figure 11:
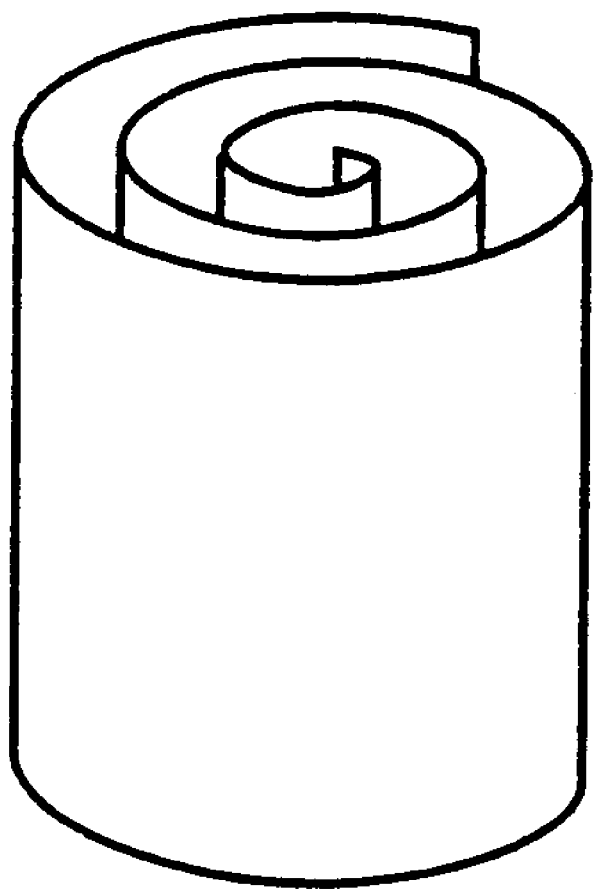
FIG. 11 is a view showing a tool path constraining surface in the case of machining of the three-dimensional surface of FIG. 10.

In the NC machining system 28 of the present embodiment, the tool path constraining surface 32 within which the movement path of the rotary machining tool 20 is constrained may be determined as needed and may be a plane or straight surface, so that the freedom in determining the tool movement path is increased, making it possible to optimize the tool movement path depending upon the geometry of the three-dimensional surface 22 to be generated. Where a three-dimensional surface shown in FIG. 9 is generated, for example, the tool can be fed smoothly along the waves (following the geometry) of the three-dimensional surface, as indicated at (a) by broken lines. That is, the present arrangement makes it possible to avoid abrupt changes in the machining direction of the tool, which may take place in the case where the tool movement path is limited within planes as indicated at (b). Where a conical shape is machined as indicated in FIG. 10, the tool is fed along a helical path continuously from the small-diameter end to the large-diameter end, as indicated at (a) by broken line. This arrangement permits higher machining efficiency and accuracy (surface smoothness) than in the case where the machining is effected in steps along paths having respective different diameters as indicated at (b) by broken lines. In the case of machining of FIG. 10, each tool path constraining surface 32 may-be determined to be a part of a spiral surface as shown in FIG. 11.

In the present embodiment, the NC data are generated based on the three-dimensional curved line equations representing the lines of intersection 34 between the tool constraining surface 12 and the tool path constraining surfaces 32, and the NC machine tool 18 is controlled such that the rotary machining tool 20 is fed to the successive target positions which are sequentially determined to lie on the three-dimensional curved lines represented by the equations. This arrangement permits a highly accurate machining operation with a relatively small volume of control data.

That is, the tool movement path according to the NC data is substantially coincident with the desired tool movement path, as indicated in FIG. 12. Since the target positions lie on this tool movement path of the NC data, the machining can be effected with high accuracy by simply reducing the spacing distance between the target positions, as indicated at (b). The spacing distance can be reduced by shortening the control cycle time of the NC machine tool 18, or lowering the feed rate of the tool. On the other hand, the machining accuracy cannot be improved by shortening the spacing distance of the target positions as indicated at (b) in FIG. 13, where the tool movement path is defined by a series of tool path defining points (CL), and the target positions to which the rotary cutting tool 20 of the NC machine tool 18 are fed are determined by linear interpolation of those tool path defining points CL. To improve the machining accuracy, the number of the tool path defining points CL should be increased as indicated at (c) in FIG. 13. In this case, the volume of the control data is extremely increased.

In the above embodiment explained above, the step S1 is adapted to determine the tool constraining surface 12 according to an offset method based on the normal vectors. However, it is desired to determine the tool constraining surface 12 according to different methods, as indicated in the flow chart of FIG. 14, depending upon whether the surface to be generated is an acute triangular surface or not. Described more specifically, step SA1 is implemented to determine whether the three-dimensional surface 22 to be generated includes an acute triangular area. This determination is effected according to a predetermined condition. If the acute triangular area is not included in the surface 22, step SA2 is implemented to determine the tool constraining surface 12 according to the offset method based on the normal vectors described above. If the acute triangular area is included, step SA3 is implemented to determine the tool constraining surface 12 according to a spherical layout method. The acute triangular area is a triangular surface having an acute angle smaller than a predetermined value, as indicated at 100 in FIG. 15. The determination in step SAl may be effected by determining whether any adjacent sides of the triangular surface area forms an angle smaller than a predetermined lower limit. The acute triangular surface area 100 has an acute apex 100a at which it is difficult to accurately calculate the normal vectors since it is difficult to accurately determine the direction normal to the surface. Therefore, the normal vectors cannot be accurately obtained for the acute triangular surface 100, according to the offset method. The predetermined lower limit of the angle used to determine whether the surface 12 includes the acute triangular surface area 100 is determined by taking into account the accuracy of calculation of the normal vectors.

Figure 16:
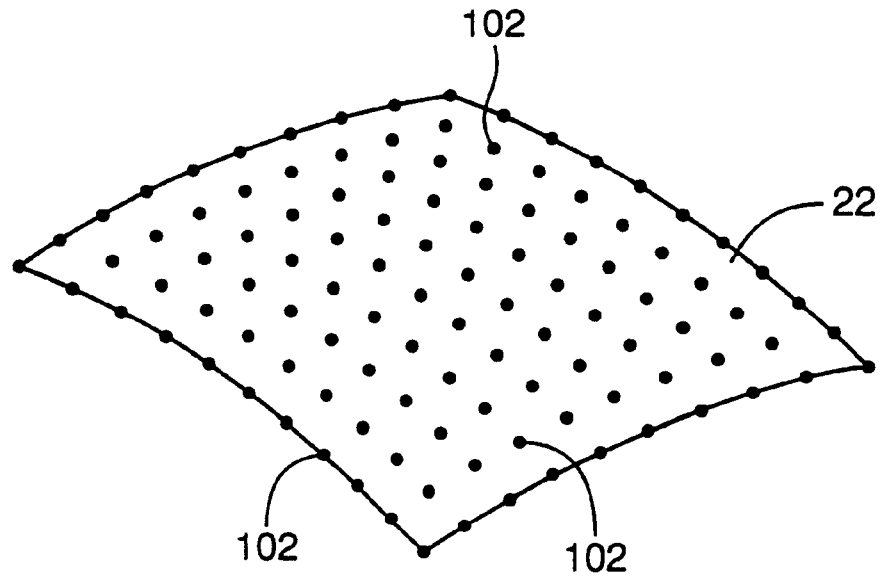
FIG. 16 is a view illustrating reference points defined on a three-dimensional surface where a tool constraining surface is determined according to a spherical layout method.
Figure 17:
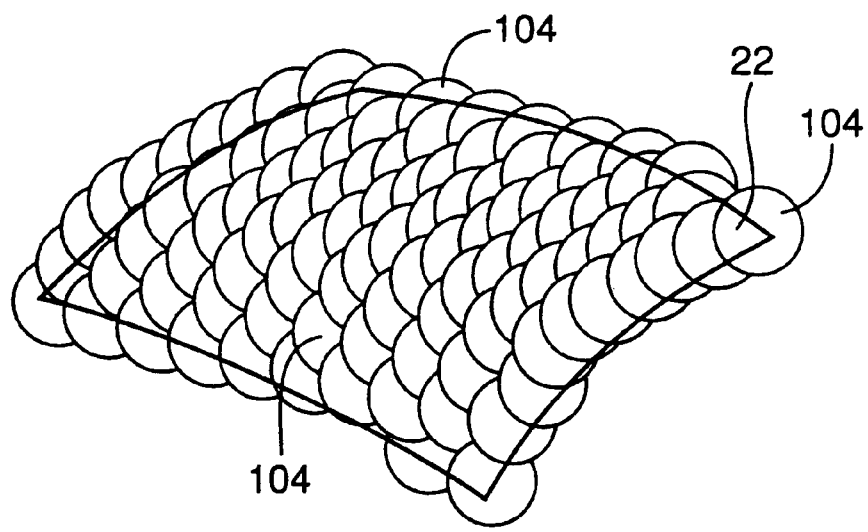
FIG. 17 is a state in which a multiplicity of spheres whose centers lie on the reference points are defined on the three-dimensional surface.
Figure 18:
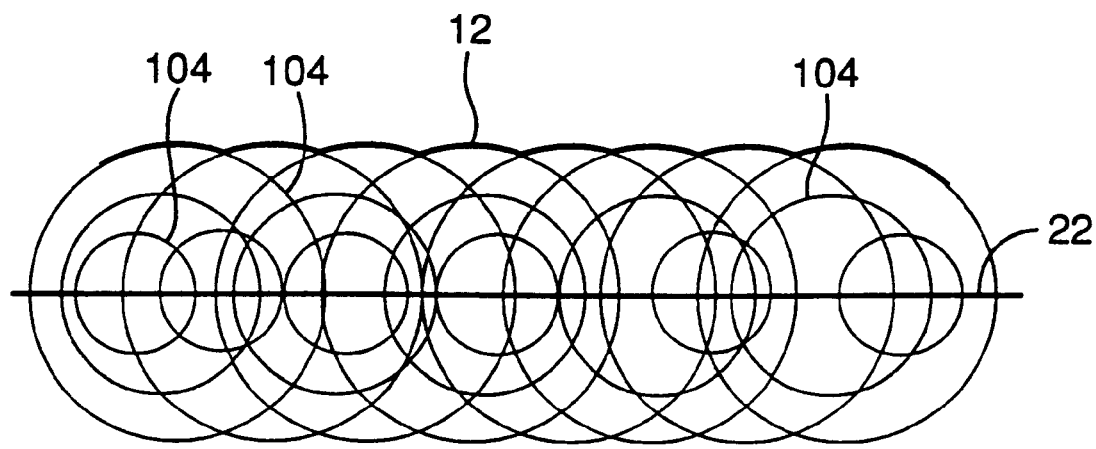
FIG. 18 is a view showing in cross section one example of the tool constraining surface determined according to the spherical layout method, together with the spheres and the three-dimensional surface.
Figure 19:
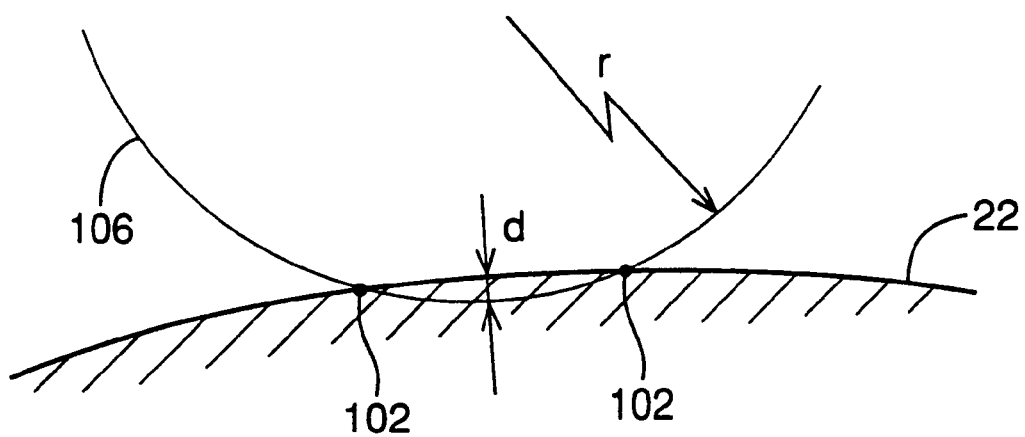
FIG. 19 is a view illustrating a spacing interval of the reference points in FIG. 16.

In the spherical layout method, a multiplicity of reference points 102 are located on the three-dimensional surface 22, with a predetermined spacing between the adjacent points 102, as indicated in FIG. 16. Spheres 104 whose radius is equal to the radial dimension r of the rotary machining tool 20 are positioned such that the centers of the spheres 104 are located at the reference points 102, respectively, as shown in FIG. 17. The tool constraining surface 12 is defined by segments of the surfaces of the spheres 104, which are most distant from the three-dimensional surface 22 in a direction away from the workpiece (in the upward direction), as indicated by solid lines in FIG. 18. The accuracy of the tool constraining surface 12 can be increased with a decrease in the spacing between the adjacent reference points 102. However, the decrease in the spacing causes an increase in the volume of the data that should be processed. In this respect, it is desirable to determine the spacing of the reference points 102 in the following manner, for example. That is, a sphere 106 having a radius equal to the radial dimension r of the rotary machining tool 20 is positioned such that the surface of the sphere 106 passes the two adjacent reference points 102 on the three-dimensional surface 22 and such that the sphere 106 overlaps the workpiece, as shown in FIG. 19. The spacing of the reference points 102 is determined such that a maximum overlapping dimension d in the direction normal to the three-dimensional surface 22 is not larger than a predetermined tolerance. The spacing of the reference points 102 may be determined to be constant based on only the radial dimension r of the rotary machining tool 20, assuming that the three-dimensional surface 22 was a straight surface. However, it is preferred to change the spacing depending upon the characteristics (maximum radius of curvature) of the surface 22 to be generated, for each product to be manufactured. It is noted that FIG. 18 shows the mutually overlapping spheres 104 in cross section in a plane substantially perpendicular to the three-dimensional surface 22.

In the spherical layout method described above, the tool constraining surface 12 which is offset from the three-dimensional surface 22 in the direction away from the workpiece by a distance equal to the radial dimension r of the rotary machining tool 20 can be obtained with high accuracy, even where the surface 22 is the acute triangular surface 100 whose normal vectors cannot be obtained with high accuracy. The spherical layout method may be employed for determining the tool constraining surface 12 corresponding to a specific three-dimensional surface 22 other than the acute triangular surface 100, where the normal vectors of the surface 22 cannot be obtained with high accuracy, for example, where the calculation of the normal vectors suffers from a considerable variation.

Figure 20:
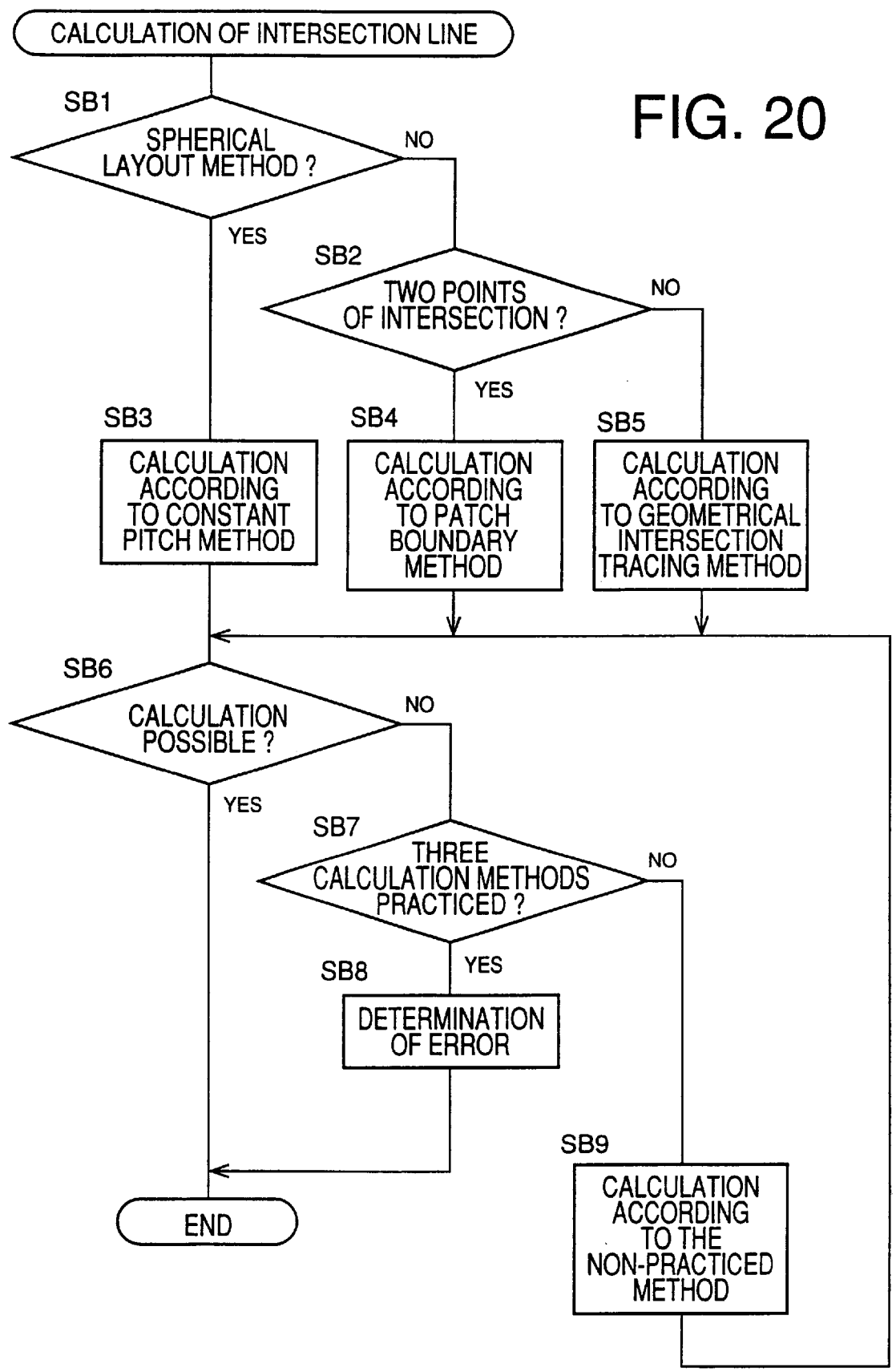
FIG. 20 is a flow chart illustrating one example of step S3 in FIG. 4.
Figure 21:
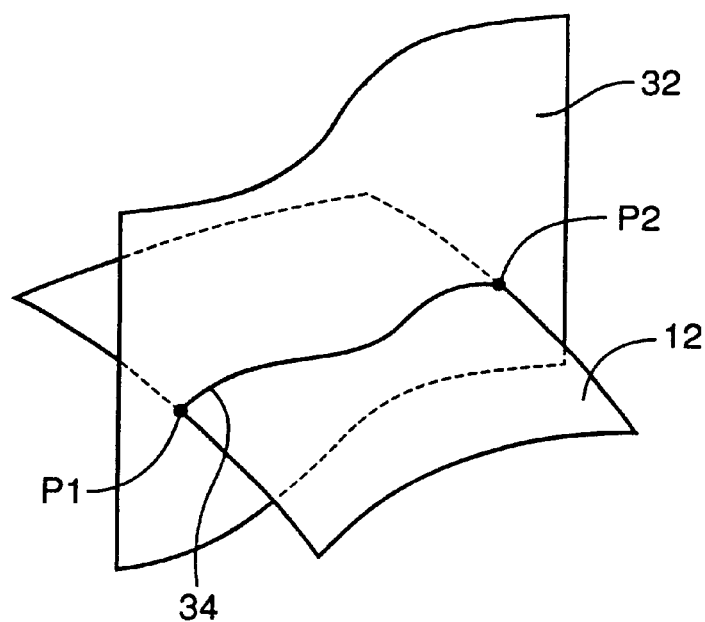
FIG. 21 is a view showing one example of a case where there exist two points of intersections between the periphery of the tool constraining surface and the tool path constraining surface.
Figure 22:
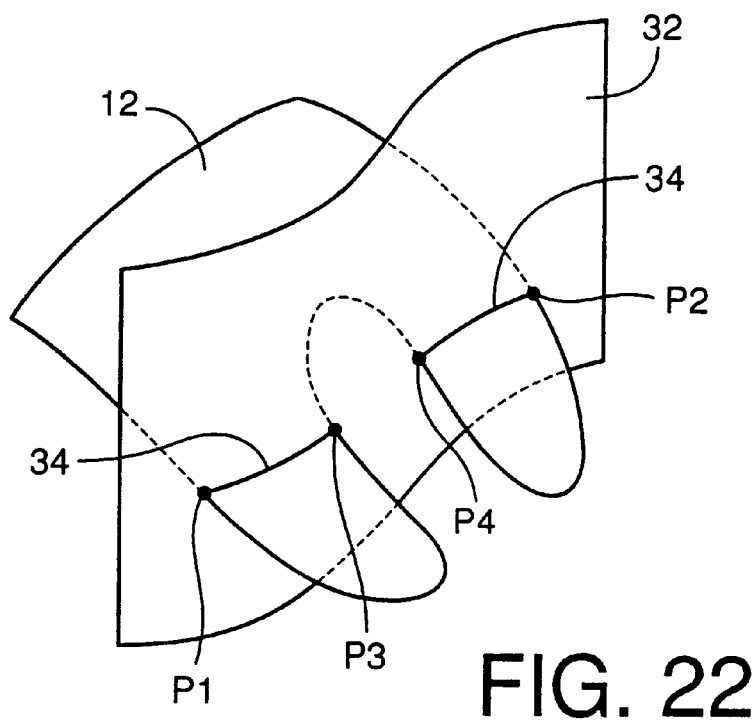
FIG. 22 is a view showing one example of a case where there exist three or more points of intersection between the periphery of the tool constraining surface and the tool path constraining surface.
Figure 23:
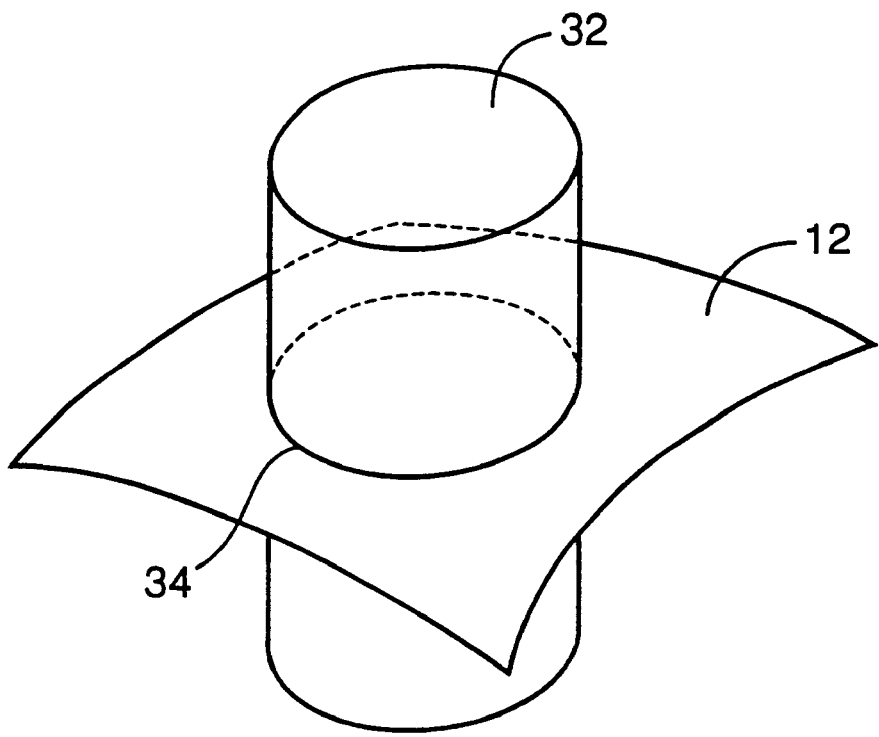
FIG. 23 is a view showing one example of a case where no points of intersection exist between the periphery of the tool constraining surface and the tool path constraining surface.

The step S3 in the above embodiment is desirably implemented to obtain the three-dimensional curved line equations of the intersection lines 34, according to a routine illustrated in the flow chart of FIG. 20 by way of example. Step SB1 of FIG. 20 is implemented to determine whether the tool constraining surface 12 has been determined according to the spherical layout method. If the spherical layout method was used to determine the tool constraining surface 12, step SB3 is implemented to calculate the three-dimensional curved line equation of the intersection line 34 according to a constant pitch method. If the spherical layout method was not used, that is, if the offset method based on the normal vectors was used, step SB2 is implemented to determine whether there exist two points of intersection between the edge of the tool constraining surface 12 and the tool path constraining surface 32. If two intersection points P1 and P2 exist as shown in FIG. 21, step SB4 is implemented to calculate the three-dimensional curved line equation according to a patch boundary method. If the number of the intersection points is not equal to two, as shown in FIGS. 22 and 23, step SB5 is implemented to calculate the three-dimensional curved line equation of the intersection line 34 according to a geometrical intersection tracing method. The series of steps from the step of determining the tool constraining surface 12 to the step SB3 of calculating the three-dimensional curved line equation corresponds to a third calculating step recited in claim 6, and the series of steps to the step SB4 of calculating the three-dimensional curved line equation corresponds to a first calculating step recited in claim 6, while the series of steps to the step SB5 of calculating the three-dimensional curved line equation corresponds to a second calculating step recited in claim 6.

It is noted that the edge of the tool constraining surface 12 means the outer periphery of the surface 12, and corresponds to the outer periphery of the three-dimensional surface 22 to be generated.

Figure 24:
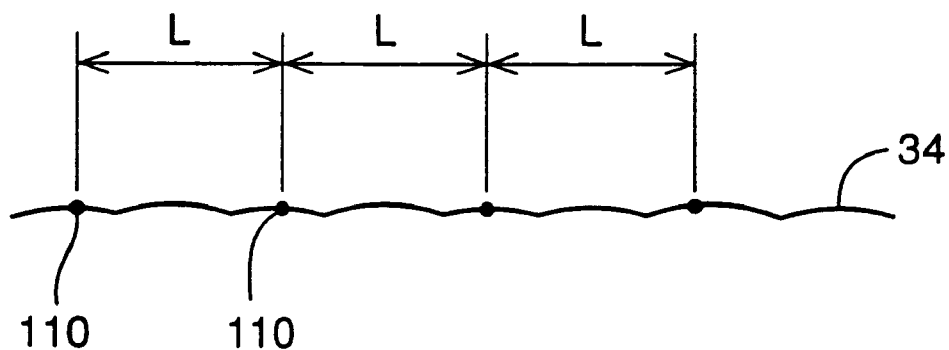
FIG. 24 is a view illustrating an example of a case where three-dimensional curved line equations are used to obtain a line of intersection between the tool constraining surface and the tool path constraining surface according to the spherical layout method.

According to the constant pitch method in the step SB3, a multiplicity of reference points 110 are set, as shown in FIG. 24, at a predetermined pitch L on the intersection line 34 between the tool constraining surface 12 and the tool path constraining surface 32, along a geometrical variation in the Z axis in the X-Y plane of the tool path constraining surface 32, and the three-dimensional curved line equation is calculated by a suitable fitting process to smoothly connect the reference points 110. The predetermined pitch L is determined to be approximately equal to (tolerance×tool diameter×20), for example. The value "20" is an empirically determined value, which may be changed as needed. FIG. 24 shows the intersection line 34 developed along the geometrical variation in the X-Y plane of the tool path constraining surface 32.

In this case where the tool constraining surface 12 consists of a group of part-spherical surfaces of the multiple spheres 104, the intersection line 34 between the surface 12 and the tool path constraining surface 32 is waved as shown in FIG. 24. The three-dimensional curved line equation may obtained by obtaining, as the intersection line 34, an envelope line which smoothly connects the tops of the convex parts of the wave. In this case, other methods such as the patch boundary method and the geometrical intersection tracing method may be suitably applied. The tool constraining surface 12 may be defined by a smooth envelope surface including the apex portions of the multiple part-spherical surfaces and their vicinities.

Figure 25:
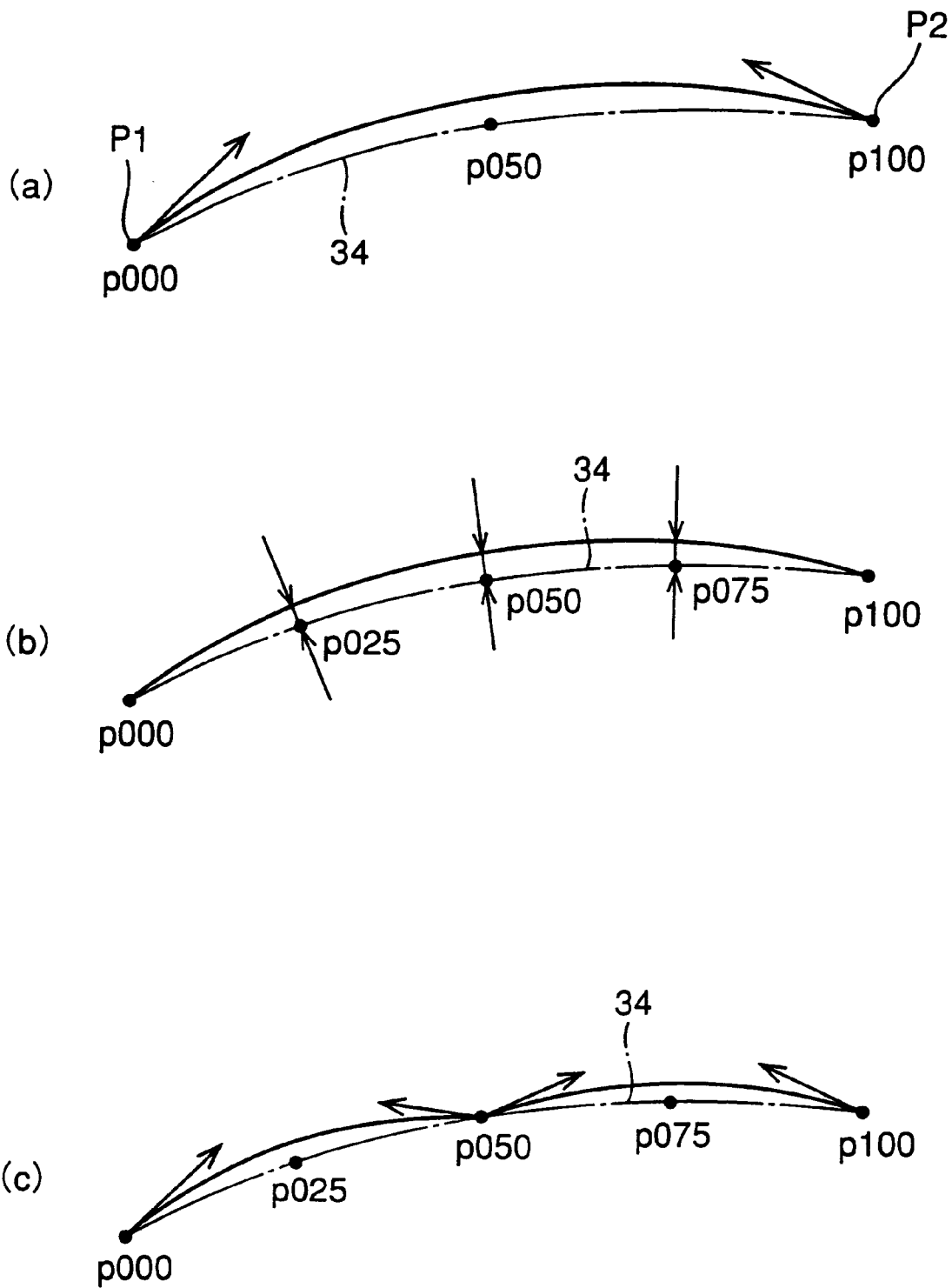
FIG. 25 is a view illustrating an example of a case where three-dimensional curved line equations of the line of intersection between the tool constraining surface and the tool path constraining surface are obtained according to a patch boundary method.
Figure 27:
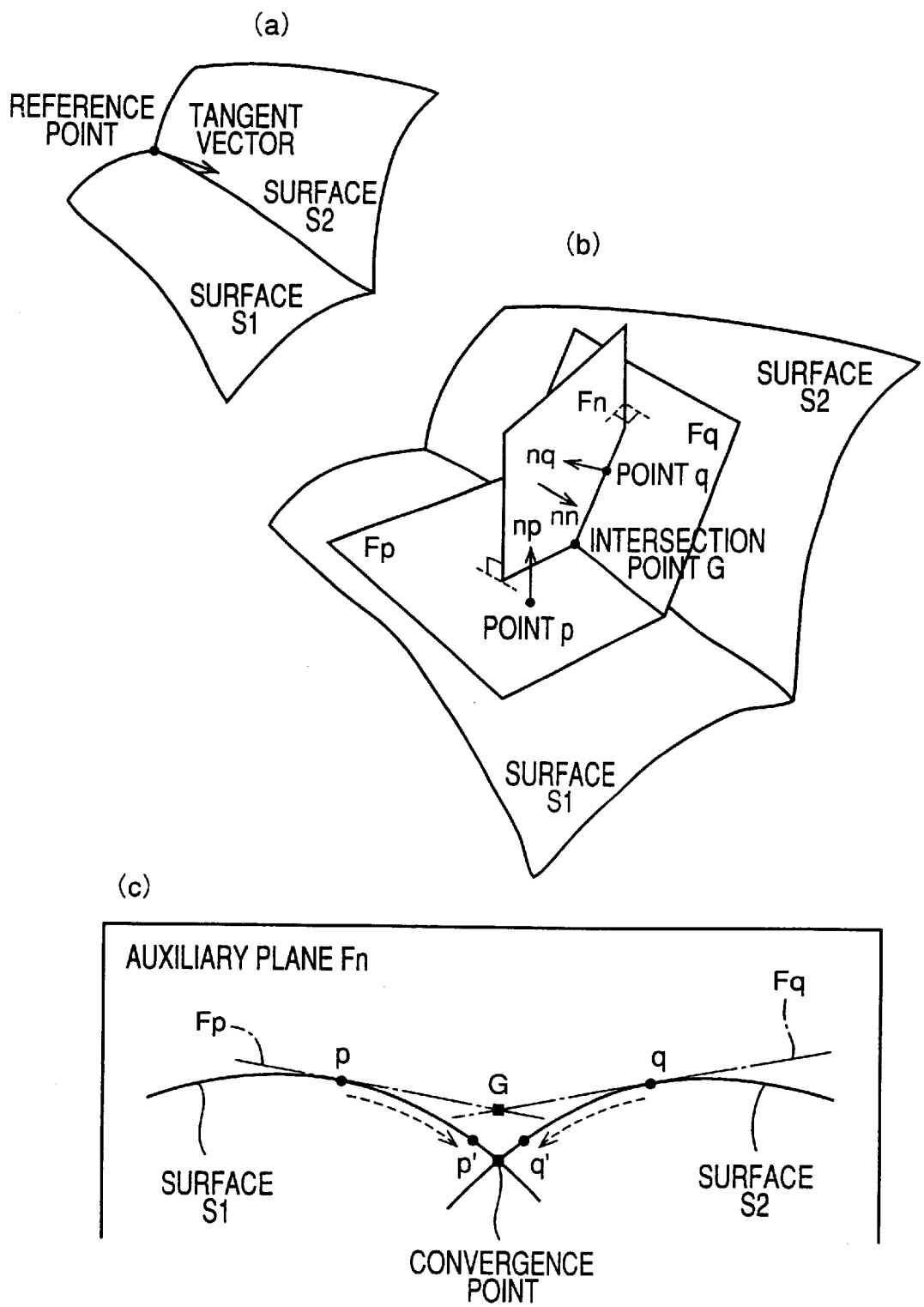
FIG. 27 is a view illustrating a manner of obtaining intersection points when the line of intersection is obtained according to the geometrical tracing method.

According to the patch boundary method in the step SB4, the intersection line 34 is considered to exist between the two intersection points P1, P2 as indicated in FIG. 21. In this case, a three-dimensional curved line substantially coincident with the intersection line 34 is obtained between the intersection points P1, P2, as shown in FIG. 25. Described in detail, a three-dimensional curved line passing a midpoint P050 of the intersection line 34 or a point as close as possible to the midpoint is obtained, as shown in FIG. 25($a$), by suitably adjusting the magnitude and direction of the tangent vectors at the intersection points P1, P2 which are considered to define a segment. Then, intermediate points P025 and P075 intermediate between the midpoint P050 and the intersection points P1, P2 are obtained, and errors of the obtained three-dimensional curved line at these points are checked as to whether the errors are held within the tolerance. If the errors are held within the tolerance, an equation of this three-dimensional curved line is obtained as the three-dimensional curved line equation of the intersection line. If any one of the errors is larger than the tolerance, the original segment is divided by the midpoint P050 (as a segment point) into two new segments, as indicated in FIG. 25($c$), and the error at the midpoint of each new segment is checked. Similar procedure is repeated until the error at the midpoint is reduced to within the tolerance. This patch boundary method has a higher processing speed and a smaller number of the segments, than the geometrical intersection tracing method. Further, where the two intersection points exist, the intersection line 34 usually exists between these two points, and therefore, it is not necessary to effect a determination as whether the intersection line 34 exists. That is, the two intersection points P1, P2 can be considered to define the opposite ends of the intersection line 34.

Where the geometrical intersection tracing method is practiced in the step SB5 when there exist intersections P1 through P4 as indicated in FIG. 26($a$), these intersection points P1–P4 are used as the reference points, and a three-dimensional curved line substantially coincident with the intersection line 34 is obtained by determining an amount of tracing of the intersection line 34 in the tangential direction. In the case where an intersection line between a surface S1 having parameters (u, v) and a surface S2 having parameters (s, t) as shown in FIG. 27($a$) is obtained according to the geometrical intersection tracing method, the reference points are first obtained. The intersection points P1–P4 indicated above are used as the initial reference points. Next intersection points are obtained by obtaining the tangent vector each reference point, which tangent vector defines the tracing directions and amounts. The tracing direction may be obtained by obtaining an outer product of a normal vector on each of the surfaces S1, S2 at the reference point. The tracing amount is desirably adjusted depending upon the curvature of the geometry. Namely, the tracing amount decreases with an increase in the curvature and increases with a decrease in the curvature. It is noted that one and the other of the surfaces S1, S2 correspond to the tool constraining surface 12 and the tool path constraining surface 32, respectively.

Then, the thus obtained tangent vectors are projected on the surfaces S1, S2. In other words, the tangent vectors are represented by (u, v) and (s, t), and increments (du, dv) and (ds, dt) of the parameters with respect to the reference points are obtained. Initial points p, q on the surfaces S1, S2 on which the parameters have been increased from the reference points by the obtained increments are obtained. Then, there are obtained a tangent plane Fp with respect to the surface S1 at the point p, a tangent plane Fq with respect to the surface S2 at the point q, and an auxiliary plane Fn normal to the tangent planes Fp, Fq. These three planes Fp, Fq, Fn intersect each other at a point, which is used as an intersection point G between the surfaces S1, S2. The following convergence calculation is effected so as to sufficiently reduce the error at the intersection point G. It is noted that "np" represents a unit normal vector at the point p, "nq" represents a unit normal vector at the point q, while "nn" represents a unit normal vector of the auxiliary plane Fn.

To begin with, a parameter increment toward the intersection point G is obtained. Described in detail, the increments Au and Av of the parameters u, v at the point p, for example, can be obtained according to the following equations (1) and (2), using the tangent vectors, normal vectors and points G, p, q. In the equations, "du" and "dv" represent the tangent vectors in the directions u and v at the point p, respectively.

$$\Delta u = (sv \cdot dp)/(sv \cdot du) \tag{1}$$

$$\Delta v = (su \cdot dp)/(su \cdot dv) \tag{2}$$

wherein, dp=G−p  su=du×np  sv=dv×np

By adding the parameter increments, there are obtained points P' and q' on the surfaces S1, S2. These points p', q' are used as the new points p, q, and the above processing is repeated until a distance |p'−q'| between the two points p' and q' is sufficiently reduced (to within a predetermined tolerance, for example). The intersection point G when the distance |p'−q'| has been sufficiently reduced is used as a point of intersection between the surfaces S1 and S2. Using the thus obtained intersection point and the tangent vectors of the surfaces, a curved line connecting the two points is obtained as the intersection line. This processing is repeatedly performed to obtain a group of intersection lines between the surfaces S1 and S2, from which the tool path is obtained.

When there does not exist an intersection point between the edge of the tool constraining surface 12 and the tool path constraining surface 32 as shown in FIG. 23, reference points 122 are determined by forming a parameter constant line 120 on the tool constraining surface 12. Then, the three-dimensional curved line equation of the intersection line 34 can be similarly obtained.

Although the geometrical intersection tracing method has a lower processing speed and a larger number of segments than the patch boundary method, the processing according to the geometrical intersection tracing method can be initiated for one of the intersection points, without determination as to whether there exists the intersection line 34, even where the three or more intersection points exist. Further, the present method makes it possible to suitably obtain the three-dimensional curved line equation of the intersection line 34, even where the intersection line 34 has a complicated geometrical change.

Referring back to FIG. 20, the steps SB3, SB4 and SB5 of calculating the three-dimensional curved line equation are followed by step SB6 to determine whether the calculation to obtain the three-dimensional curved line equation was possible. It the calculation was possible, the routine to calculate the intersection line is terminated. If the calculation was not eventually possible due to some error, step SB7 is implemented. The type of the error differs depending upon the calculation method employed. Where the patch boundary method is employed, the error is constituted to interrupt the routine if the number of the divisions of the intersection line 34 exceeds a predetermined value, for example. Where the geometrical intersection tracing method is employed, the error is constituted to interrupt the routine if the number of the convergence calculations exceeds a predetermined value, for example.

In the step SB7, a determination is made as to whether all of the three calculation methods, constant pitch method, patch boundary method and geometrical intersection tracing method, have been employed. If the three methods have been employed, step SB8 is implemented to determine the presence of some error, and provide an indication as on a display device, that the three-dimensional curved line equation could not be calculated due to the error. If any of the above-indicated three methods has not been tried yet, step SB9 is implemented to calculate the three-dimensional curved line equation according to this method. If the patch boundary method and the geometrical intersection tracing method have been employed, the constant pitch method is practiced. IN this case, the tool constraining surface 12 is determined according to the spherical layout method. If the constant pitch method has been employed, the patch boundary method or the geometrical intersection tracing method is practiced. In this case, the tool constraining surface 12 is determined according to the offset method based on the normal vectors. Where the patch boundary method is practiced and where there exist three or more intersection points between the edge of the tool constraining surface 12 and the tool path constraining surface 32, the determination as to whether there exists the intersection line 34 is initially effected, and the three-dimensional curved line equation is obtained for the intersection line 34 existing between the two intersection points.

In the arrangement described above, the three calculating methods (including the methods for determining the tool constraining surface 12) are selectively used depending upon the geometry (characteristic) of the three-dimensional surface 22 to be generated, and the number of the intersection points between the edge of the tool constraining surface 12 and the tool path constraining surface 32. Accordingly, the three-dimensional curved line equation can be obtained in a minimum length of time. Further, if the calculation according to one of the methods is not possible due to an error, the other method or methods is/are tried to obtain the three-dimensional curved line equation.

Figure 28:
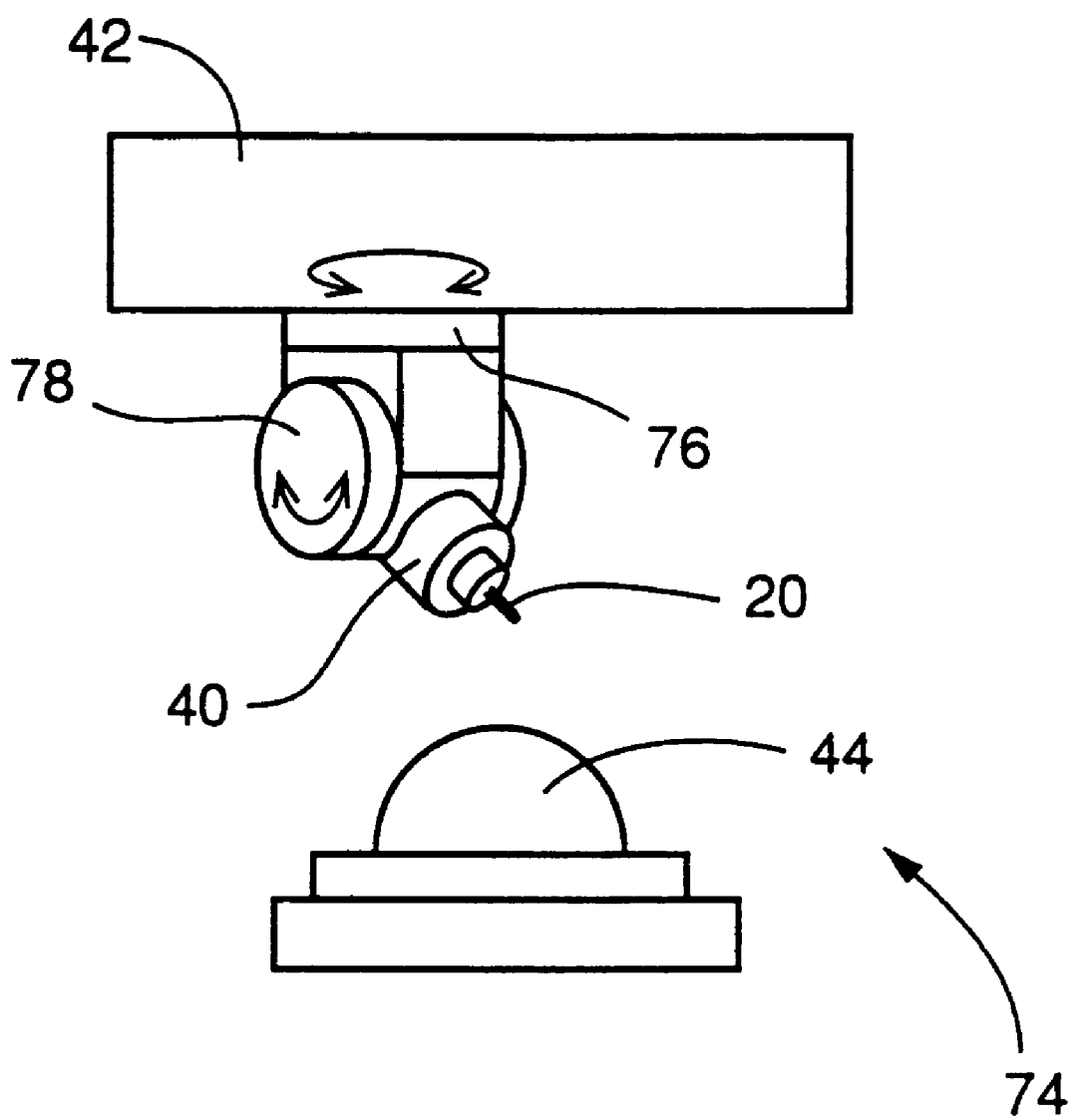
FIG. 28 is a view illustrating one example of an NC machine tool having five axes.

There will be described an example in which a workpiece is machined using an NC machine tool 74 having five axes as shown in FIG. 28. This NC machine tool 74 has first attitude control means 76 for rotating the main spindle drive means 40 about an axis parallel to the Z axis, and second attitude control means 78 for rotating the main spindle drive means 40 about an axis perpendicular to the axis of rotation of the first attitude control means, as well as the main spindle drive means 40 and the three-axes feed drive means 42, so that the attitude of the rotary machining tool 20 with respect to the stationary workpiece 44 can be controlled as desired by the first and second attitude control means 76, 78.

Figure 29:
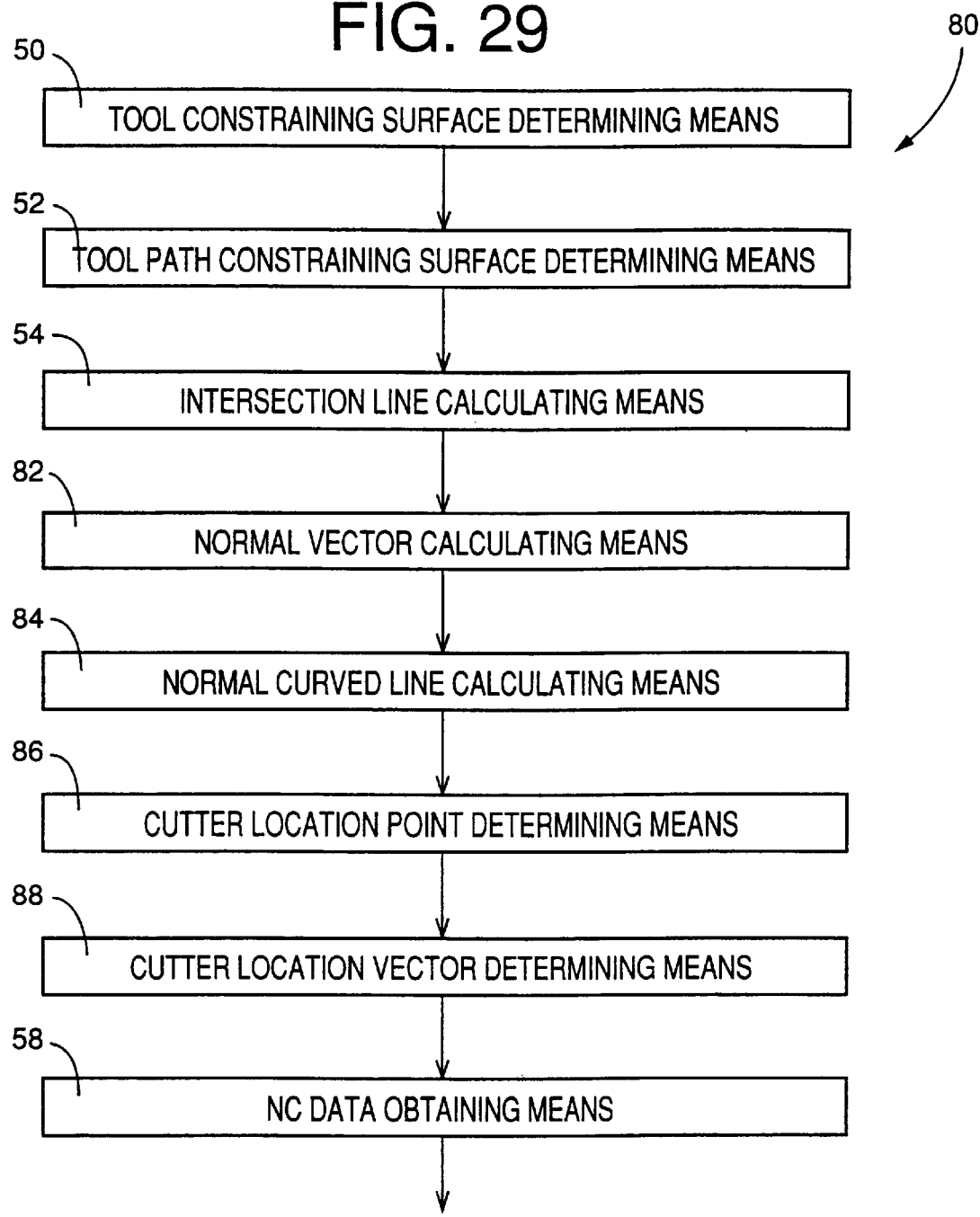
FIG. 29 is a functional block diagram of an NC data generating device used for machining using the NC machine tool of FIG. 28.

FIG. 29 is a functional block diagram explaining an NC data generating device 80 suitable for generating NC data for performing a machining operation using the five-axes NC machine tool 74 described above. The NC data generating device 80 includes normal vector calculating means 82, normal curved line calculating means 84, cutter location point determining means 86 and cutter location vector determining means 88, as well as the tool constraining surface determining means, tool path constraining surface determining means 52, intersection line calculating means 54 and NC data obtaining means 58, which have been described above. The NC data generating device 80 is adapted to generate NC data according to a flow chart of FIG. 30.

Figure 30:
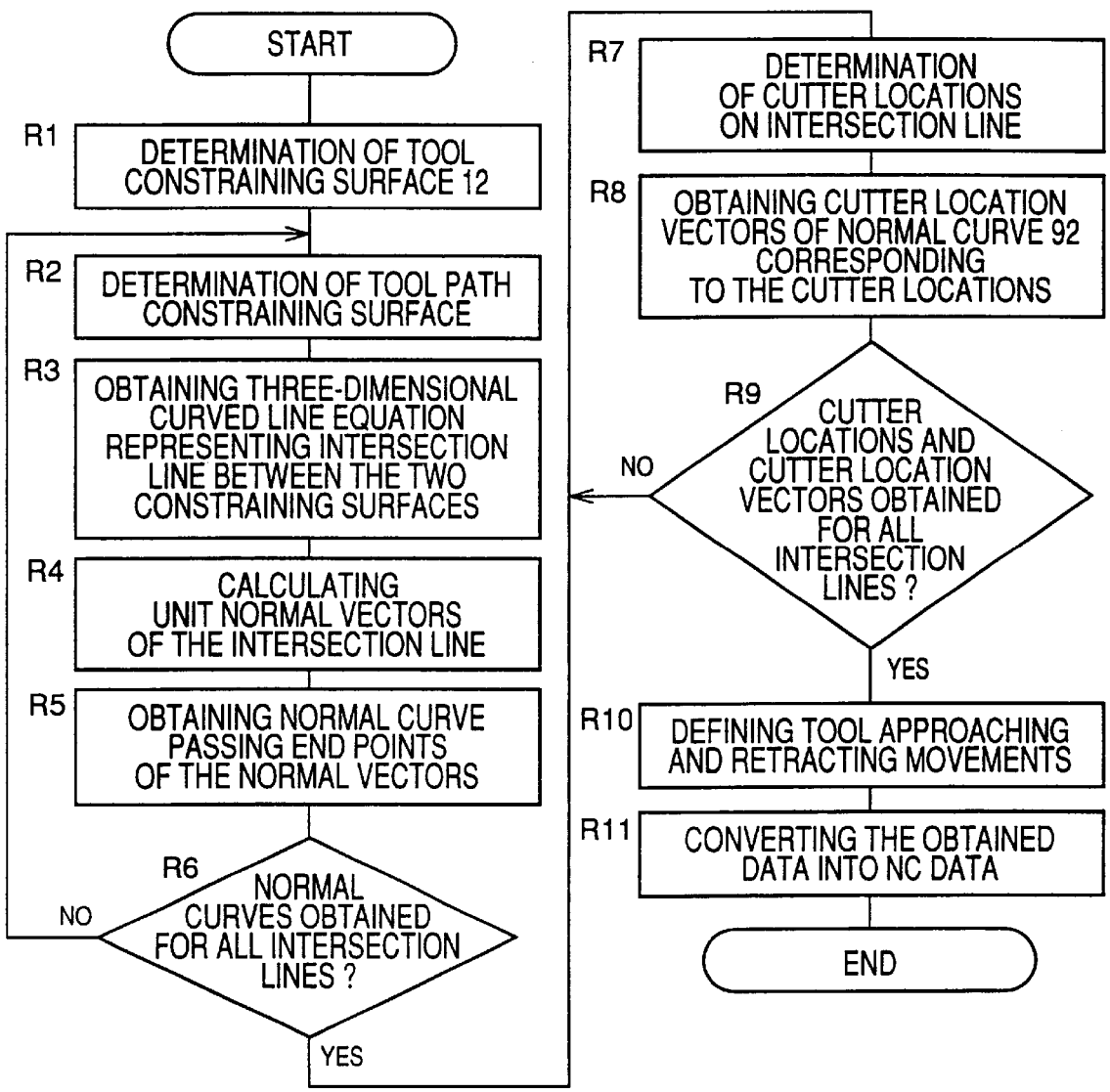
FIG. 30 is a flow chart illustrating an operation of the NC data generating device of FIG. 29.
Figure 31:
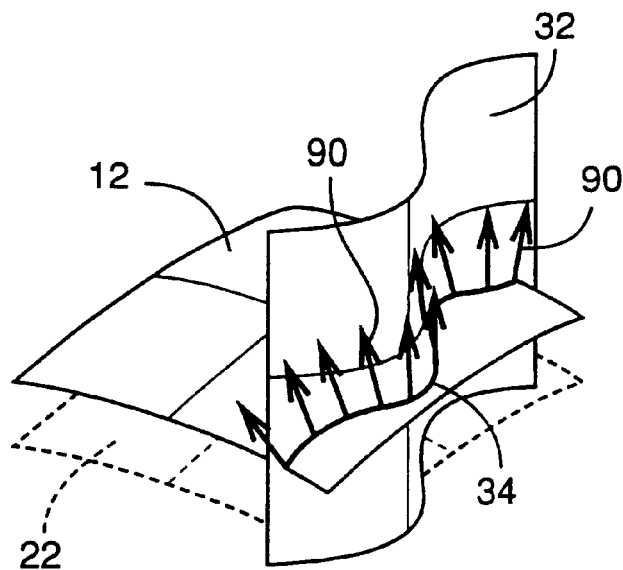
FIG. 31 is a view illustrating a content of step R4 of FIG. 30.

Steps R1, R2 and R3 of FIG. 30 are identical with the steps S1, S2 and S3 described above. Step R4 is implemented by the normal vector calculating means 82 to calculate, as unit normal vectors, normal (perpendicular) vectors 90 of the tool constraining surface 12, on the intersection line 34 obtained in step R3, at an interval which depends upon the curvature of the curved line (which decreases with an increase in the curvature), as shown in FIG. 31. The curvature of the intersection line 34 is obtained by sampling the curvature values at several points which are selected on the intersection line 34 at a predetermined spacing interval.

Figure 32:
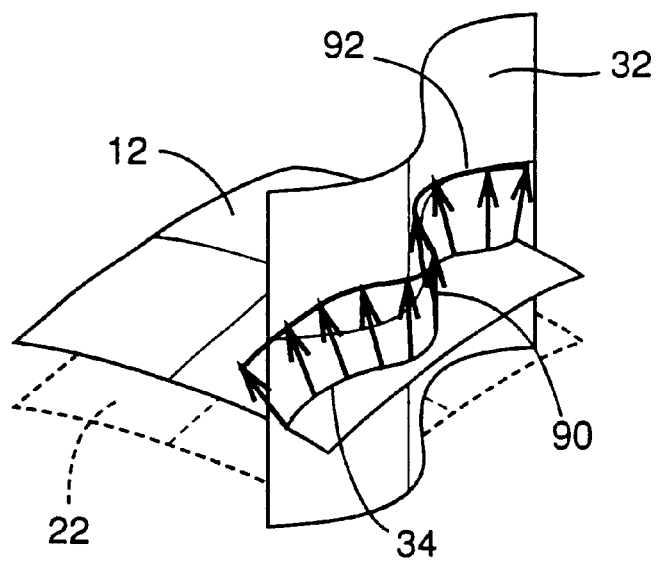
FIG. 32 is a view illustrating a content of step R5 of FIG. 30.

Then, step R5 is implemented by the normal curved line calculating means 84 to calculate a normal curved line 92, which is a smooth curve passing the end points of the normal vectors 90 obtained in step R4, as shown in FIG. 32. The normal curved line 92 is retained (stored) in relation to the intersection line 34 defining the tool movement path. Like the intersection line 34, this normal curved line 92 is represented by a three-dimensional curved line equation. With the intersection line 34 and the normal curved line 92 being stored in relation to each other, the normal direction at a selected point on the intersection line 34 can be calculated or retrieved as a line, without recognition of a surface.

Figure 33:
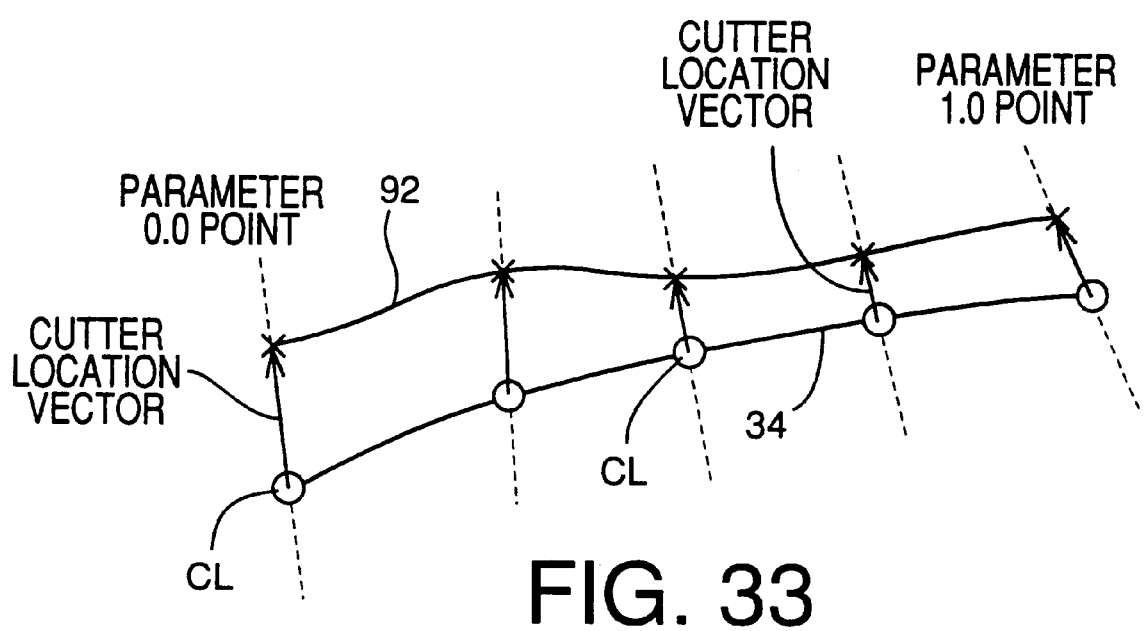
FIG. 33 is a view illustrating a content of steps R7 and R8 of FIG. 30.

Step R6 is identical with the step S4 described above. Step R7 and the subsequent steps are implemented to generate the NC data for controlling the NC machine tool 74 to move the rotary machining tool 20 in a linear interpolation mode. The step R7 is implemented by the cutter location point determining means 86 to determine a multiplicity of cutter location points (CL) on the three-dimensional curved line in the form of the intersection line 34 defining the tool movement path, as shown in FIG. 33, so as to meet predetermined conditions which are specified by manual data input by the operator. For example, the predetermined conditions include a tolerance range, a constant cutter location pitch, a high-speed cutter location pitch, and a cutter location pitch corresponding to one cutting edge. Step R8 is implemented by the cutter location vector determining means 88 to calculate the cutter location vectors, which are normal vectors at the cutter location points, as indicated in FIG. 33, by obtaining the points corresponding to the individual cutter location points, from the normal curved line 92 stored in parametric relation to the intersection line 34.

The above steps R7 and R8 are implemented for each intersection line 34. The next step R9 is implemented to determine whether the cutter location points and the cutter location vectors have been obtained for all of the intersection lines 34. The steps R7 and R8 are repeatedly implemented until the cutter location points and the cutter location vectors have been obtained for all the intersection lines 34. The step R9 is-automatically implemented also by the cutter location vector determining means 88. When the cutter location points and the cutter location vectors have been obtained for all the intersection lines 34, step R10 is implemented to define the approaching movement 60, retracting movement 62 and transverse incremental feed movements 64 which are also necessary for the machining operation. Step R11 is then implemented to convert the cutter location points, cutter location vectors, approaching movement 60 and other data relating to the tool movement path and tool attitude, into the NC data including the tool movement path data, in the form of codes available for controlling the NC machine tool 74. This step R11 is implemented by the NC data obtaining means 58.

Figure 13:
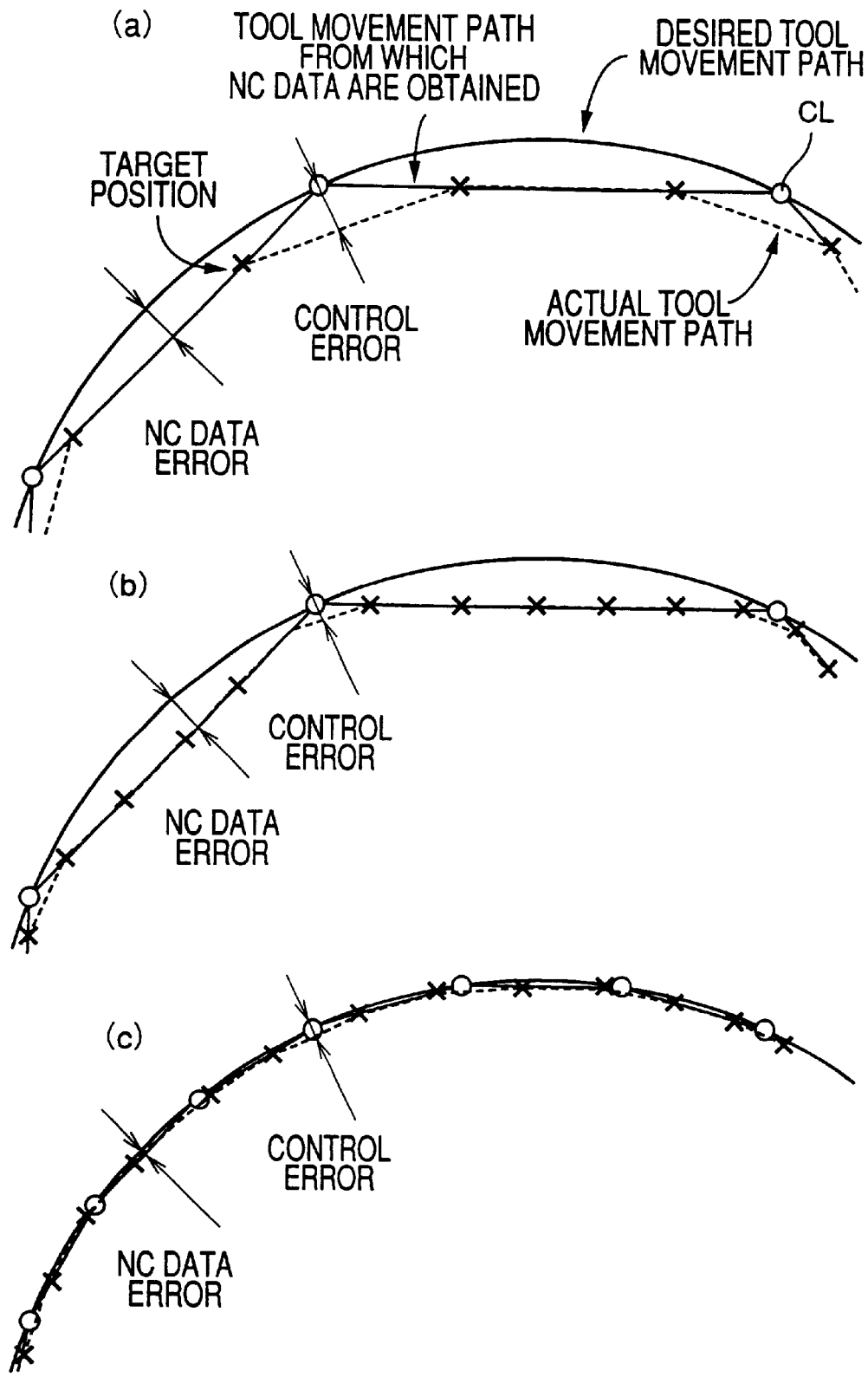
FIG. 13 is a view illustrating a tool movement path in the case of a tool movement by linear interpolation of cutter locations.

The feed drive means 42 of the NC machine tool 74 of FIG. 28 is controlled according to the NC data relating to the cutter location points, to move the rotary machining tool 20 in the linear interpolation mode as indicated in FIG. 13, while the rotation is controlled by the main spindle drive means 40. The attitude control means 76, 78 are controlled according to the NC data relating to the cutter location vectors, to control the attitude of the main spindle drive means 40 and rotary machining tool 20, such that the axis of rotation of the tool is aligned with the directions of the cutter location vectors, namely, perpendicular to the three-dimensional surface 22. The movement of the main spindle drive means 40 by the feed drive means 42 is compensated according to the cutter location vectors so that the center of the rotary machining tool 20 is moved to the target positions defined by the cutter location points, irrespective of the attitude of the rotary machining tool 20. This compensation according to the cutter location vectors may be effected upon generation of the NC data by the NC data generating device 80.

In the present embodiment, the rotary machining tool 20 is moved with its axis of rotation held constant in substantially perpendicular relationship with respect to the three-dimensional surface 22 to be generated. Accordingly, the present arrangement is effective to eliminate a variation in the machining accuracy (surface roughness) due to a change in the tool attitude relative to the surface 22, whereby the three-dimensional surface 22 is machined with further improved accuracy. Further, the present arrangement permits machining of a complicated geometry such as an undercut.

Since the smooth normal curved line 92 passing the end points of the normal vectors 90 is obtained, the time required for calculating the normal vectors 90 can be reduced by reducing the number of the normal vectors 90. Since the three-dimensional curved line equation of the normal curved line 92 corresponds to the three-dimensional curved line equation of the intersection line 34, the normal vectors (cutter location vectors) of the tool constraining surface 12 at the cutter location points sequentially set on the three-dimensional curved intersection line 34 can be obtained from the three-dimensional curved line equation of the normal curved line 92. Thus, the cutter location points CL can be determined as desired depending upon the required accuracy.

Since the step R4 is adapted to obtain the normal * vectors 90 at the spacing interval according to the curvature of the intersection 34, the number of the normal vectors 90 to be calculated can be reduced while maintaining high accuracy of the normal curved line 92 obtained in the step R5.

The present embodiment corresponds to a method of generating the tool movement path data recited in claim 7. The step R1 corresponds to the first constraining surface determining step, and the step R2 corresponds to the second constraining surface determining step. The step R3 corresponds to the intersection calculating step, and the step R4 corresponds to the normal vector calculating step. The step R5 corresponds to the normal curved line calculating step, and the steps R7, R8, R10 and R11 correspond to the movement path data generating step.

Figure 34:
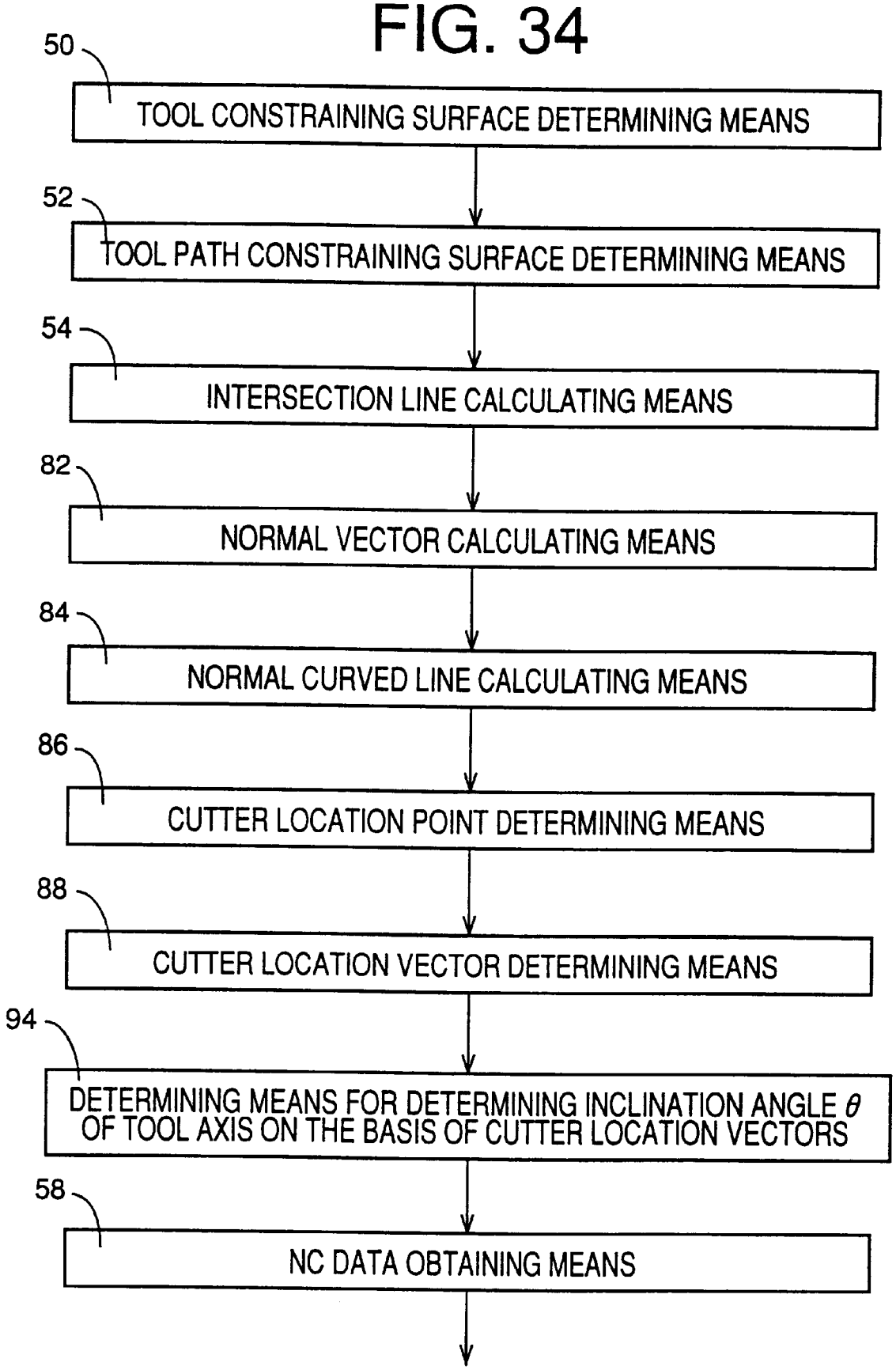
FIG. 34 is a functional block diagram illustrating another example of an NC data generating device used for machining using the NC machine tool of FIG. 28.
Figure 35:
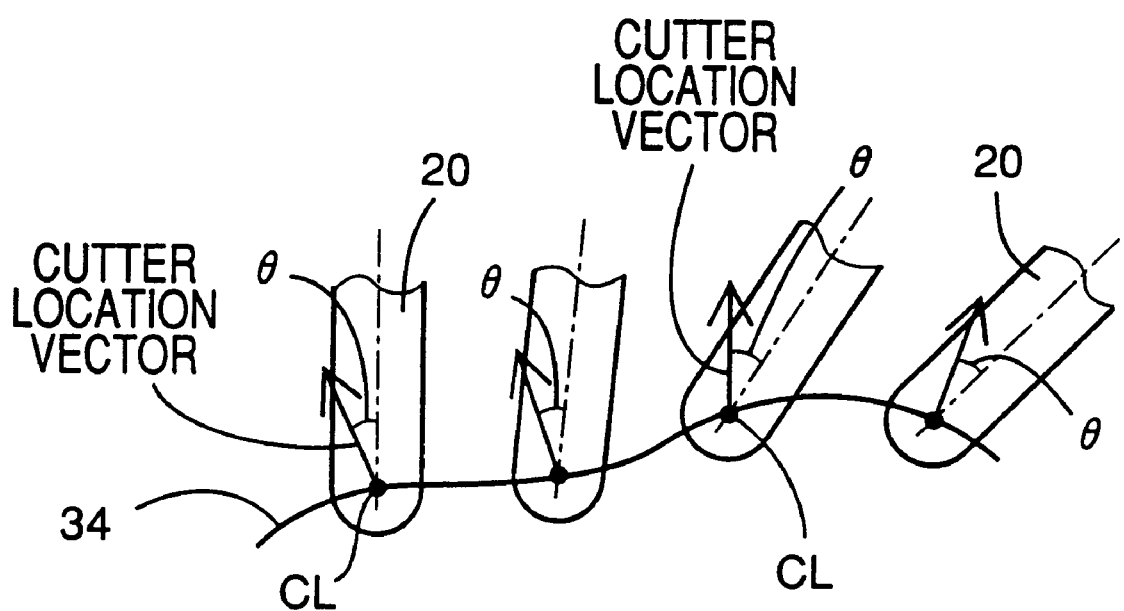
FIG. 35 is a view illustrating a content of determining means for determining an inclination angle θ in FIG. 34.

In the above-explained example, the attitude of the rotary machining tool is held constant in substantially perpendicular relationship with respect to the tool constraining surface 12, that is, with respect to the three-dimensional surface 22 to be generated. However, determining means 94 for determining an inclination angle e of the tool axis based on the cutter location vectors may be provided so that the determining means 94 is operated between the operations of the cutter location vector determining means 88 and the NC data obtaining means 58, as indicated in FIG. 34. In this case, the rotary machining tool 20 is moved with its axis being inclined by the inclination angle e with respect to the cutter location vectors (with respect to the direction perpendicular to the three-dimensional surface 22), as indicated in FIG. 35. This Ad arrangement permits the machining by a radially outer portion of the tool at which the peripheral cutting speed is higher, so that the machining performance is improved without insufficient cutting speed. The present arrangement is suitably applied to a machining operation using a ball end mill or other rotary cutting tool as the rotary machining tool 20.

Figure 36:
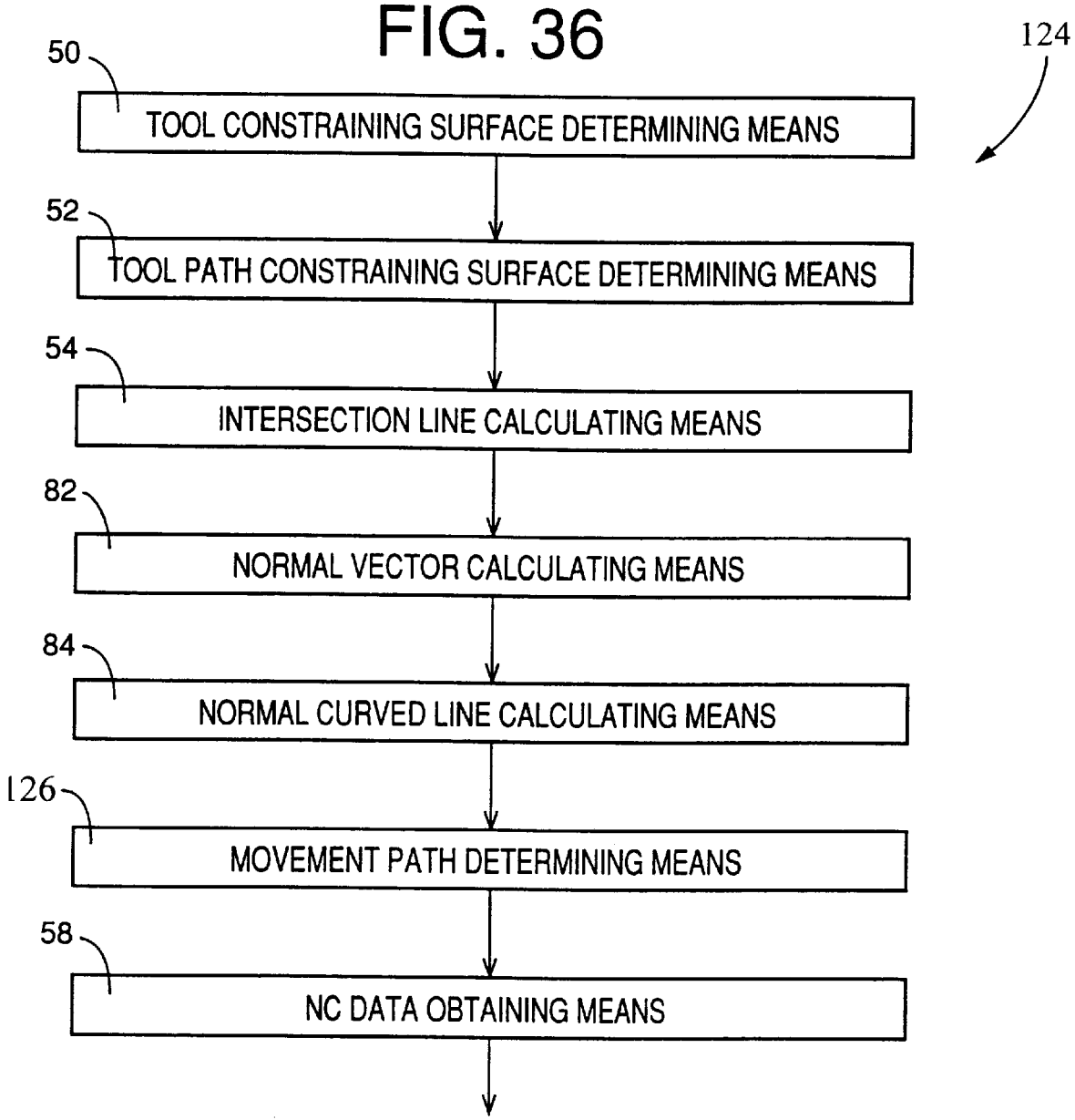
FIG. 36 is a functional block diagram illustrating a further example of an NC data generating device used for machining using the NC machine tool of FIG. 28.

While the above embodiment is adapted to generate the NC data including the multiple cutter location points CL, the NC data may be generated using three-dimensional curved line equations as in the first embodiment. FIG. 36 is a functional block diagram explaining an NC data generating device 124 adapted to this end. The NC data generating device 124 includes movement path determining means 126 in place of the cutter location point determining means 86 and the cutter location vector determining means 88 which have been described, and is adapted to generate the NC data according to a flow chart of FIG. 37.

Figure 37:
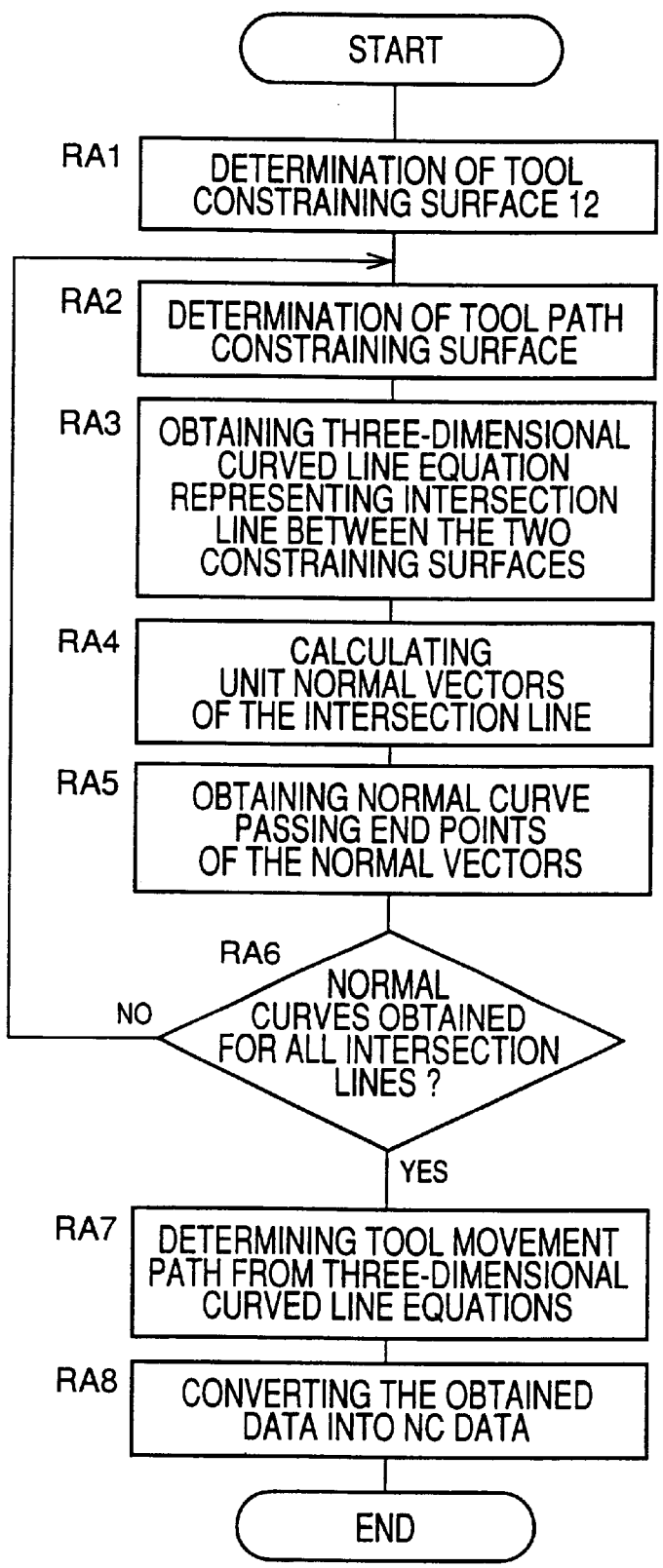
FIG. 37 is a flow chart illustrating an operation of the NC data generating device of FIG. 36.

Steps RA1–RA6 and RA8 of FIG. 37 are identical with the steps R1–R6 and R11 described above. Step RA7 is implemented by the movement path determining means 126 to determine the tool movement path based on the three-dimensional curved line of the intersection line 34 and the three-dimensional curved line equation of the normal curved line 92. In the step RA7, the approaching, retracting and transverse increment feed movements necessary for the machining operation are also determined as in the above-indicated step S5. When the desired positions are determined on the NC machine tool 74 by circular interpolation on the three-dimensional lines represented by the equations of the intersection lines 34, the normal vectors at the target positions are obtained from the three-dimensional curved line equations of the normal curved lines 92, as in the above step R8, so that the tool attitude is determined according to the inclination angle θ.

In this embodiment, the volume of the NC data is considerably reduced as compared with that in the above embodiment in which the NC data are generated by determining the cutter location vectors at the multiplicity of cutter location points.

The present embodiment corresponds to a method of generating the tool movement path data recited in claims 2 and 7. In this method, the step RA1 corresponds to the first constraining surface determining step, and the step RA2 corresponds to the second constraining surface determining step. The step RA3 corresponds to the intersection line calculating step, and the step RA4 corresponds to the normal vector calculating step. The step RAS corresponds to the normal curved line calculating step, and the steps RA7 and RA8 correspond to the movement path data generating step. Further, the step RA7 corresponds to the movement path determining step recited in claim 9, and the movement path determining means 126 corresponds to the movement path determining means recited in claim 10. The movement path determining means 126 and the NC data obtaining means 58 correspond to the movement path data generating means recited in claim 8, while the NC data generating device 124 corresponds to the tool movement path data generating device recited in claim 8.

While the embodiments of the present invention have been explained in detail by reference to the drawings, the invention may be otherwise embodied.

In the illustrated embodiments, the workpiece 44 is held stationary and the rotary machine tool 20 is moved with or without its attitude being controlled. However, the workpiece 44 may be moved or rotated about a predetermined axis, for example. Further, the manner of movements (including movements for changing the attitude) of the rotary machining tool 20 and the workpiece 44 may be suitably modified as needed.

It is to be understood that the present invention may be embodied with various other changes and improvements, which may occur to those skilled in the art.

INDUSTRIAL APPLICABILITY

As described above, the present invention is suitably applicable to the generation of tool movement path go data for moving the rotary machining tool relative to the workpiece for generating a three-dimensional surface, the generation of tool movement path data including tool attitude control data, for generating a three-dimensional surface while controlling the attitude of the machining tool with respect to the workpiece, and the generation of a three-dimensional surface by moving the machining tool relative to the workpiece.

What is claimed is:

1. A method of generating tool movement path data for moving a machining tool and a workpiece relative to each other for machining a desired three-dimensional surface, characterized by comprising:

a first constraining surface determining step of determining a first constraining surface for constraining said machining tool to machine said three-dimensional surface, said first constraining surface corresponding to said three-dimensional surface;

a second constraining surface determining step of determining a second constraining surface for constraining a movement path of said machining tool, said second constraining surface consisting of a surface other than a straight surface and other than said three-dimensional surface, and intersecting said first constraining surface;

an intersection line calculating step of obtaining a three-dimensional curved line equation representing a line of intersection between said first and second constraining surfaces; and a movement path data obtaining step of obtaining said movement path data including said three-dimensional curved line equation obtained in said intersection line calculating step.

2. A method according to claim 1, further comprising:

a normal vector calculating step of obtaining normal vectors of said first constraining surface on the intersection line between said first and second constraining surfaces, at a predetermined spacing interval; and a normal curved line calculating step of obtaining a three-dimensional curved line equation representing a smooth normal curved line passing end portions of said normal vectors, in relation to the intersection line between said first and second constraining surfaces, and wherein said movement path data obtaining step comprises generating the tool movement path data including the three-dimensional curved line equation of the intersection line between said first and second constraining surfaces, and the three-dimensional curved line equation of said normal curved line so that the tool movement path data include data indicative of an attitude of said machining tool.

3. A method according to claim 1 wherein said intersection line calculating step comprises obtaining the three-dimensional curved line equation of the intersection line between said first and second constraining surfaces, according to a patch boundary method, where there exist two points of intersection between an edge of said first constraining surface and said second constraining surface.

4. A method according to claim 1, wherein said intersection line calculating step comprises obtaining the three-dimensional curved line equation of the intersection line between said first and second constraining surfaces, according to a geometrical intersection tracing method, where the number of points of intersection between an edge of said first constraining surface and said second constraining surface is not equal to two;

where the number of the intersecting points is not equal to two, it is desirable to obtain.

5. A method according to claim 1, wherein said machining tool has a machining end portion having a semi-spherical shape, and said first constraining surface constrains a center of a sphere of said semi-spherical machining end portion, and wherein said first constraining surface determining step comprises determining, where it is determined that the normal direction cannot be correctly recognized in at least a portion of said three-dimensional surface to be generated, a multiplicity of reference points on said three-dimensional surface at a predetermined spacing interval, locating spheres having a radius equal to that of said semi-spherical machining end portion of said machining tool, in alignment with centers of the reference points, respectively, and defining said first constraining surface based on segments of spherical surfaces of the spheres which are most distant from the three-dimensional surface.

6. A method according to claim 1, said machining tool has a machining end portion having a semi-spherical shape, and said first constraining surface constrains a center of a sphere of said semi-spherical machining end portion, and wherein the three-dimensional curved line equation of the intersection line between said first and second constraining surfaces is obtained by one of three calculating methods consisting of a first method, a second method and a third method, said first method being practiced where it is determined that a normal direction of the three-dimensional surface to be generated can be correctly recognized, said first method comprising obtaining normal vectors of said three-dimensional surface and determining as said first constraining surface an offset surface which is offset from said three-dimensional surface in the normal direction by a distance equal to a radius of said semi-spherical machining end portion of said machining tool, in said first constraining surface determining step, said first method further comprising obtaining the three-dimensional curved line equation of the intersection line between said first and second constraining surfaces according to a patch boundary method, in said intersection line calculating step, where there exist two points of intersection between an edge of said first constraining surface and said second constraining surface, said second method being practiced where it is determined that the normal direction of the three-dimensional surface to be generated can be correctly recognized, said second method comprising obtained normal vectors of said three-dimensional surface and determining as said first constraining surface an offset surface which is offset from said three-dimensional surface in the normal direction by a distance equal to the radius of said semi-spherical machining end portion of said machining tool, in said first constraining surface determining step, said second method further comprising obtaining the three-dimensional curved line equation of the intersection line between said first and second constraining surfaces according to a geometrical intersection tracing method, in said intersection line calculating step, where the number of said points of intersection between the edge of said first constraining surface and said second constraining surface, said third method being practiced where it is determined that the normal direction cannot be correctly recognized in at least a portion of said three-dimensional surface to be generated, said third method comprising determining a multiplicity of reference points on said three-dimensional surface at a predetermined spacing interval, locating spheres having a radius equal to that of the semi-spherical machining end portion of said machining tool, in alignment with centers of the reference points, respectively, and defining said first constraining surface based on segments of spherical surfaces of the spheres which are most distant from the three-dimensional surface, in said first constraining surface determining step, said third method further comprising obtaining the three-dimensional curved line equation of the intersection line between said first and second constraining surfaces in a predetermined calculating manner, in said intersection line calculating step, and wherein if an error is constituted in said one of said three methods, the three-dimensional curved line equation is obtained according to another of said three methods.

7. A method of generating tool movement path data for moving a machining tool and a workpiece relative to each other for machining a desired three-dimensional surface, characterized by comprising:

a first constraining surface determining step of determining a first constraining surface for constraining said machining tool to machine said three-dimensional surface, said first constraining surface corresponding to said three-dimensional surface;

a second constraining surface determining step of determining a second constraining surface for constraining a movement path of said machining tool, said second constraining surface consisting of a straight or curved surface which is other than said three-dimensional surface, and intersecting said first constraining surface and said three-dimensional surface to be machined;

an intersection line calculating step of obtaining a three-dimensional curved line equation representing a line of intersection between said first and second constraining surfaces;

a normal vector calculating step of obtaining normal vectors of said first constraining surface on the intersection line between said first and second constraining surfaces, at a predetermined spacing interval;

a normal curved line calculating step of obtaining a smooth normal curved line passing end points of said normal vectors; and a movement path data generating step of obtaining said movement path data including data representing an attitude of said machining tool, based on the intersection line between said first and second constraining surface and said normal curved line.

8. A device for generating tool movement path data for moving a machining tool and a workpiece relative to each other for machining a desired three-dimensional surface, characterized by comprising:

first constraining surface determining means for determining a first constraining surface for constraining said machining tool to machine said three-dimensional surface, said first constraining surface corresponding to said three-dimensional surface;

second constraining surface determining means for determining a second constraining surface for constraining a movement path of said machining tool, said second constraining surface consisting of a surface other than a straight surface and other than said three-dimensional surface, and intersecting said first constraining surface;

intersection line calculating means for obtaining a three-dimensional curved line equation representing a line of intersection between said first and second constraining surfaces; and movement path data generating means for obtaining said movement path data including data three-dimensional curved line equation obtained by said intersection line obtaining means.

9. A method of machining a desired three-dimensional surface in a workpiece, by moving a machining tool and a workpiece, said method comprising:

a first constraining surface determining step of determining a first constraining surface for constraining said machining tool to machine said three-dimensional surface, said first constraining surface corresponding to said three-dimensional surface;

a second constraining surface determining step of determining a second constraining surface for constraining a movement path of said machining tool, said second constraining surface consisting of a surface other than a straight surface and said three-dimensional surface, and intersecting said first constraining surface;

an intersection line calculating step of obtaining a three-dimensional curved line equation representing a line of intersection between said first and second constraining surfaces;

a movement path determining step of determining the movement path of the machining tool by using said three-dimensional curved line equation obtained in said intersection line obtaining step; and a tool moving step of determining successive target positions on the movement path which is determined in said movement path determining step and which is a three-dimensional curved line represented by said three-dimensional curved line equation, and moving said machining tool relative to said workpiece.

10. A machining system for machining a desired three-dimensional surface in a workpiece by moving a machining tool and a workpiece relative to each other said machining system comprising:

first constraining surface determining means for determining a first constraining surface for constraining said machining tool to machine said three-dimensional surface, said first constraining surface corresponding to said three-dimensional surface;

second constraining surface determining means for determining a second constraining surface for constraining a movement path of said machining tool, said second constraining surface consisting of a surface other than a straight surface and said three-dimensional surface, and intersecting said first constraining surface;

intersection line calculating means for obtaining a three-dimensional curved line equation representing a line of intersection between said first and second constraining surfaces;

movement path determining means for determining the movement path of the machining tool by using said three-dimensional curved line equation obtained in said intersection line obtaining step; and tool movement control means for determining successive target positions on the movement path which is determined in said movement path determining step and which is a three-dimensional curved line represented by said three-dimensional curved line equation, and moving said machining tool relative to said workpiece.

11. A method according to claim 2, characterized in that said intersection line calculating step comprises obtaining the three-dimensional curved line equation of the intersection line between said first and second constraining surfaces, according to a patch boundary method, where there exist two points of intersection between an edge of said first constraining surface and said second constraining surface.

12. A method according to claim 2, characterized in that said intersection line calculating step comprises obtaining the three-dimensional curved line equation of the intersection line between said first and second constraining surfaces, according to a geometrical intersection tracing method, where the number of points of intersection between an edge of said first constraining surface and said second constraining surface is not equal to two where the number of the intersecting points is not equal to two, it is desirable to obtain.

13. A method according to claim 3, characterized in that said intersection line calculating step comprises obtaining the three-dimensional curved line equation of the intersection line between said first and second constraining surfaces, according to a geometrical intersection tracing method, where the number of points of intersection between an edge of said first constraining surface and said second constraining surface is not equal to two where the number of the intersecting points is not equal to two, it is desirable to obtain.

14. A method according to claim 2, characterized in that said machining tool has a machining end portion having a semi-spherical shape, and said first constraining surface constrains a center of a sphere of said semi-spherical machining end portion, and wherein said first constraining surface determining step comprises determining a multiplicity of reference points on said three-dimensional surface at a predetermined spacing interval, locating spheres having a radius equal to that of said semi-spherical machining end portion of said machining tool, in alignment with centers of the reference points, respectively, and defining said first constraining surface based on segments of spherical surfaces of the spheres which are most distant from the three-dimensional surface.

15. A method according to claim 3, characterized in that said machining tool has a machining end portion having a semi-spherical shape, and said first constraining surface constrains a center of a sphere of said semi-spherical machining end portion, and wherein said first constraining surface determining step comprises determining a multiplicity of reference points on said three-dimensional surface at a predetermined spacing interval, locating spheres having a radius equal to that of said semi-spherical machining end portion of said machining tool, in alignment with centers of the reference points, respectively, and defining said first constraining surface based on segments of spherical surfaces of the spheres which are most distant from the three-dimensional surface.

16. A method according to claim 4, characterized in that said machining tool has a machining end portion having a semi-spherical shape, and said first constraining surface constrains a center of a sphere of said semi-spherical machining end portion, and wherein said first constraining surface determining step comprises determining a multiplicity of reference points on said three-dimensional surface at a predetermined spacing interval, locating spheres having a radius equal to that of said semi-spherical machining end portion of said machining tool, in alignment with centers of the reference points, respectively, and defining said first constraining surface based on segments of spherical surfaces of the spheres which are most distant from the three-dimensional surface.

17. A method according to claim 2, characterized in that said machining tool has a machining end portion having a semi-spherical shape, and said first constraining surface constrains a center of a sphere of said semi-spherical machining end portion, and wherein the three-dimensional curved line equation of the intersection line between said first and second constraining surfaces is obtained by one of the three calculation methods consisting of a first method, a second method and a third method, said first method being practiced where it is determined that a normal direction of the three-dimensional surface to be generated can be correctly recognized, said first method comprising obtaining normal vectors of said three-dimensional surface and determining as said first constraining surface an offset surface which is offset from said three-dimensional surface in the normal direction by a distance equal to a radius of said semi-spherical machining end portion of said machining tool, in said first constraining surface determining step, said first method further comprising obtaining the three-dimensional curved line equation of the intersection line between said first and second constraining surfaces according to a patch boundary method, in said intersection line calculation step, where three exist two points of intersection between an edge of said first constraining intersection between an edge of said first constraining surface and said second constraining surface, said second method being practiced where it is determined that the normal direction of the three-dimensional surface to be generated can be correctly recognized, said second method comprising obtained normal vectors of said three-dimensional surface and determining as said first constraining surface an offset surface which is offset from said three-dimensional surface in the normal direction by a distance equal to the radius of said semi-spherical machining end portion of said machining took, in said first constraining surface determining step, said second method further comprising obtaining the three-dimensional curved line equation of the intersection line between said first and second constraining surfaces according to a geometrical intersection tracing method, in said intersection line calculating step, where the number of said points of intersection between the edge of said first constraining surface and said second constraining surface, said third method being practiced where it is determined that the normal direction cannot be correctly recognized in at least a portion of said three-dimensional surface to be generated, said third method comprising determining a multiplicity of reference points on said three-dimensional surface at a predetermined spacing interval, locating spheres having a radius equal to that of the semi-spherical machining end portion of said machining took, in alignment with centers of the reference points, respectively, and defining said first constraining surface based on segments of spherical surfaces of the spheres which are most distant from the three-dimensional surface, in said first constraining surface determining step, said third method further comprising obtaining the three-dimensional curved line equation of the intersection line between said first and second constraining surfaces in a predetermined calculating manner, in said intersection line calculating step, and wherein if an error is constituted in said one of said three methods, the three-dimensional curved line equation is obtained according to another of said three methods.

18. A method according to claim 1, wherein said machining tool has a semi-spherical shape in an end portion thereof, and wherein said second constraining surface is determined such that a center of a sphere of said end portion of said machining tool is moved on said second constraining surface.

19. A method according to claim 7, wherein said machining tool has a semi-spherical shape in an end portion thereof, and wherein said second constraining surface is determined such that a center of a sphere of said end portion of said machining tool is moved on said second constraining surface.

20. A method according to claim 8, wherein said machining tool has a semi-spherical shape in an end portion thereof, and wherein said second constraining surface is determined such that a center of a sphere of said end portion of said machining tool is moved on said second constraining surface.

21. A method according to claim 9, wherein said machining tool has a semi-spherical shape in an end portion thereof, and wherein said second constraining surface is determined such that a center of a sphere of said end portion of said machining tool is moved on said second constraining surface.

22. A method according to claim 10, wherein said machining tool has a semi-spherical shape in an end portion thereof, and wherein said second constraining surface is determined such that a center of a sphere of said end portion of said machining tool is moved on said second constraining surface.

23. A method of generating tool movement path data for moving a machining tool and a workpiece relative to each other for machining a desired three-dimensional surface, characterized by comprising:

a first constraining surface determining step of determining a first constraining surface for constraining said machining tool to machine said three-dimensional surface, said first constraining surface corresponding to said three-dimensional surface;

a second constraining surface determining step of determining a second constraining surface for constraining a movement path of said machining tool, on the basis of a geometry of said three-dimensional surface, in such a manner that makes it possible to avoid abrupt changes in a direction in which said machining tool and said workpiece are moved relative to each other, said second constraining surface consisting of a surface other than a straight surface and other than said three-dimensional surface, said second constraining surface intersecting said first constraining surface and being parallel to an axis of said machining tool;

an intersection line calculating step of obtaining a three-dimensional curved line equation representing a line of intersection between said first and second constraining surfaces; and a movement path data obtaining step of obtaining said movement path data including said three-dimensional curved line equation obtained in said intersection line calculating step.

* * * * *

UNITED STATES PATENT AND TRADEMARK OFFICE
CERTIFICATE OF CORRECTION

PATENT NO.    : 6,311,098 B1
DATED         : October 30, 2001
INVENTOR(S)   : Haruhisa Higasayama et al.

It is certified that error appears in the above-identified patent and that said Letters Patent is hereby corrected as shown below:

Column 6,
Line 13, delete "8-21008" and insert -- 8-210008 --.

Column 10,
Line 17, delete "e4" and insert -- 4 --;
Line 20, delete "*" after "S5".

Column 14,
Line 27, delete "A".

Column 22,
Line 9, delete "*";
Line 29, delete "e" after "angle" and insert -- θ --;
Line 35, delete "e" after "angle" and insert -- θ --;
Line 38, delete "Ad".

Signed and Sealed this

Thirteenth Day of August, 2002

*Attest:*

*Attesting Officer*

JAMES E. ROGAN
*Director of the United States Patent and Trademark Office*